US012226788B2

(12) United States Patent
Matter et al.

(10) Patent No.: US 12,226,788 B2
(45) Date of Patent: Feb. 18, 2025

(54) DISPENSER

(71) Applicant: S. C. JOHNSON & SON, INC., Racine, WI (US)

(72) Inventors: Jerome A. Matter, Racine, WI (US); Ronald H. Spang, Jr., Waterford, WI (US)

(73) Assignee: S. C. JOHNSON & SON, INC., Racine, WI (US)

( * ) Notice: Subject to any disclaimer, the term of this patent is extended or adjusted under 35 U.S.C. 154(b) by 231 days.

(21) Appl. No.: 17/944,682

(22) Filed: Sep. 14, 2022

(65) Prior Publication Data

US 2023/0012383 A1 Jan. 12, 2023

Related U.S. Application Data

(63) Continuation of application No. 17/143,584, filed on Jan. 7, 2021, now Pat. No. 11,484,900.

(51) Int. Cl.
*B05B 11/00* (2023.01)
*B05B 11/10* (2023.01)
(Continued)

(52) U.S. Cl.
CPC ...... *B05B 11/1074* (2023.01); *B05B 11/1032* (2023.01); *B05B 12/087* (2013.01); (Continued)

(58) Field of Classification Search
CPC ............. B05B 11/1074; B05B 11/1032; B05B 9/0861; B05B 11/028; B05B 11/1001; B05B 12/087; B05B 7/2464; B05B 7/2472
See application file for complete search history.

(56) References Cited

U.S. PATENT DOCUMENTS 3,816,028 A 6/1974 Schouteeten et al.
3,997,114 A 12/1976 Hewett
(Continued)

FOREIGN PATENT DOCUMENTS

EP 1462051 B1 2/2006
EP 1918626 B1 3/2010
(Continued)

OTHER PUBLICATIONS

International Search Report and Written Opinion of International Application No. PCT/US2021/062126 dated Mar. 24. 2022 (15 pages).

*Primary Examiner* — Frederick C Nicolas
(74) *Attorney, Agent, or Firm* — Quarles & Brady LLP

(57) ABSTRACT

A dispenser is disclosed that includes a pump having a pump chamber that receives a fluid, a pulsation dampener, and a discharge conduit. The pulsation dampener has a dampener housing with an interior volume and a dampener housing opening. A spring biased movable piston is located in the interior volume of the pulsation dampener and defines a variable volume headspace between the piston and the dampener housing opening. The discharge conduit provides fluid communication between each of an outlet of the pump chamber, the dampener housing opening, and a nozzle such that, when the pump is activated, at least a portion of fluid from the outlet of the pump chamber flows within the discharge conduit to the dampener housing opening. The dispenser is configured to, when the pump is activated, emit a substantially constant stream of fluid from the nozzle for at least one second.

20 Claims, 21 Drawing Sheets

(51) Int. Cl.
*B05B 12/08* (2006.01)
*B05B 7/24* (2006.01)
*B05B 9/08* (2006.01)
*B05B 11/02* (2023.01)

(52) U.S. Cl.
CPC ........... *B05B 7/2464* (2013.01); *B05B 7/2472* (2013.01); *B05B 9/0861* (2013.01); *B05B 11/028* (2023.01); *B05B 11/1001* (2023.01)

(56) References Cited

U.S. PATENT DOCUMENTS

| | | | |
|---|---|---|---|
| 4,646,969 A | 3/1987 | Sorm | |
| 4,706,848 A | 11/1987 | D'Andrade | |
| 4,955,511 A | 9/1990 | Blake | |
| 5,165,961 A | 11/1992 | Freeman | |
| 5,558,503 A | 9/1996 | Weller et al. | |
| 5,639,219 A | 6/1997 | Conatser | |
| 5,755,361 A | 5/1998 | Restive et al. | |
| 5,819,799 A | 10/1998 | O'Dell | |
| 6,012,647 A | 1/2000 | Ruta et al. | |
| 6,264,069 B1 | 7/2001 | Hughes et al. | |
| 6,279,836 B1 | 8/2001 | Toetschinger et al. | |
| 6,371,733 B1 | 4/2002 | Renfro | |
| 6,901,964 B2 | 6/2005 | Kippe et al. | |
| 7,021,559 B2 | 4/2006 | Fraser-Easton | |
| 7,354,255 B1 | 4/2008 | Lishanski | |
| 7,648,083 B2 | 1/2010 | Hornsby et al. | |
| 7,950,597 B2 | 5/2011 | Vanblaere et al. | |
| 8,328,120 B2 | 12/2012 | Vanblaere et al. | |
| 8,393,881 B2 | 3/2013 | Usui et al. | |
| 8,596,555 B2 | 12/2013 | Thompson et al. | |
| 8,813,789 B2 | 8/2014 | Dalhart, Sr. | |
| 8,876,502 B2 | 11/2014 | Usui et al. | |
| 9,016,599 B2 | 4/2015 | Johnson et al. | |
| 9,192,949 B2 | 11/2015 | Lang | |
| 9,227,205 B2 | 1/2016 | Tremel et al. | |
| 9,452,453 B2 | 9/2016 | Buijsman | |
| 9,517,479 B2 | 12/2016 | Hines et al. | |
| 9,518,544 B2 | 12/2016 | Bartell et al. | |
| 9,540,225 B2 | 1/2017 | Ikushima | |
| 9,545,643 B2 | 1/2017 | Thompson et al. | |
| 9,604,234 B2 | 3/2017 | Thompson et al. | |
| 9,604,235 B2 | 3/2017 | Thompson et al. | |
| 9,620,032 B2 | 4/2017 | Spandl et al. | |
| 9,709,055 B2 | 7/2017 | Usui et al. | |
| 9,897,257 B2 | 2/2018 | Despres et al. | |
| 9,914,141 B2 | 3/2018 | Thompson et al. | |
| 10,032,390 B2 | 7/2018 | Spandl et al. | |
| 10,100,855 B2 | 10/2018 | Wuerpel | |
| 10,107,285 B2 | 10/2018 | Usui et al. | |
| 10,130,028 B2 | 11/2018 | Kolb et al. | |
| 10,207,844 B2 | 2/2019 | Thukral et al. | |
| 10,335,814 B2 | 7/2019 | Lang et al. | |
| 10,343,180 B2 | 7/2019 | Rouyer et al. | |
| 10,497,285 B2 | 12/2019 | Spandl et al. | |
| 11,484,900 B2 * | 11/2022 | Matter | B05B 12/087 |
| 2014/0246506 A1 | 9/2014 | Maas et al. | |
| 2017/0122496 A1 | 5/2017 | Scannell | |
| 2018/0180225 A1 | 6/2018 | Despres et al. | |
| 2018/0214897 A1 | 8/2018 | Thompson et al. | |
| 2019/0003475 A1 | 1/2019 | Usui et al. | |
| 2019/0321845 A1 | 10/2019 | Rouyer et al. | |
| 2019/0339726 A1 | 11/2019 | Jones et al. | |
| 2019/0388930 A1 | 12/2019 | Dau et al. | |
| 2020/0043376 A1 | 2/2020 | Spandl et al. | |
| 2020/0341496 A1 | 10/2020 | Berry | |

FOREIGN PATENT DOCUMENTS

| | | |
|---|---|---|
| EP | 1834701 B1 | 12/2010 |
| EP | 1834702 B1 | 7/2011 |
| EP | 1837082 B1 | 8/2012 |
| EP | 2112368 B1 | 11/2014 |
| EP | 2826568 A1 | 1/2015 |
| EP | 2898254 A1 | 7/2015 |
| EP | 2916962 A1 | 9/2015 |
| EP | 2427273 B1 | 7/2017 |
| EP | 3286426 A1 | 2/2018 |
| EP | 2865450 B1 | 3/2018 |
| EP | 2777823 B1 | 8/2018 |
| EP | 2349584 B1 | 10/2018 |
| EP | 2803851 B1 | 10/2018 |
| EP | 3258778 B1 | 1/2019 |
| EP | 3444469 A1 | 2/2019 |
| EP | 2865449 B1 | 4/2019 |
| EP | 3523051 A1 | 8/2019 |
| EP | 2865451 B1 | 9/2019 |
| EP | 3597305 A1 | 1/2020 |
| WO | 2014047522 A1 | 3/2014 |
| WO | 2014074654 A1 | 5/2014 |
| WO | 2016170053 A1 | 10/2016 |
| WO | 2017203993 A1 | 11/2017 |
| WO | 2018065576 A1 | 4/2018 |
| WO | 2019091691 A1 | 5/2019 |
| WO | 2019212687 A1 | 11/2019 |

* cited by examiner

DISPENSER

CROSS REFERENCE TO RELATED APPLICATIONS

The present application is a continuation of U.S. patent application Ser. No. 17/143,584, filed Jan. 7, 2021, which is incorporated by reference herein in its entirety.

REFERENCE REGARDING FEDERALLY SPONSORED RESEARCH OR DEVELOPMENT

Not applicable

SEQUENCE LISTING

Not applicable

BACKGROUND

1. Field of the Background

The present disclosure relates generally to continuous spray dispensers, and more particularly, to continuous spray dispensers that implement a pulsation dampener for dispensing a fluid at a constant flow rate.

2. Description of the Background

Various fluid dispensing devices are known in the art. Generally, such devices use a pump to dispense fluid from a fluid-filled reservoir. While various types of pumps are used in existing dispensing devices, piston pumps are one type that may be used in a dispensing device. The dispensing device may be a trigger-type dispenser that requires depression of the trigger to initiate dispensing. In such a device, the trigger may activate a motor via a switch, and the motor may power the pump by reciprocating the pump piston back and forth within a pump chamber, thereby drawing fluid into the pump and discharging fluid through a nozzle.

However, existing dispensers discharge fluid in an inconsistent and discontinuous manner. More specifically, as the pump of existing dispensers transitions between an intake step and a discharge step, pressure applied by the fluid against the nozzle fluctuates, which results in varying flow rates of fluid through the nozzle. The varying flow rates cause the fluid to pulsate out of the dispenser, which is undesirable. Therefore, a continuous spray dispensing device is desired that meets or exceeds consumer expectations by providing a substantially constant fluid flow out of the nozzle.

SUMMARY

According to an embodiment, a dispenser includes a pump having a pump chamber that receives a fluid, a pulsation dampener, and a discharge conduit. The pulsation dampener has a dampener housing with an interior volume and a dampener housing opening. The pulsation dampener further includes a spring biased movable piston located in the interior volume that defines a variable volume headspace between the piston and the dampener housing opening of the pulsation dampener. The discharge conduit provides fluid communication between each of an outlet of the pump chamber, the dampener housing opening of the pulsation dampener, and a nozzle that is configured to dispense fluid when the pump is activated. When the pump is activated, at least a portion of fluid from the outlet of the pump chamber flows within the discharge conduit to the dampener housing opening of the pulsation dampener. The dispenser is configured to, when the pump is activated, emit a substantially constant stream of fluid from the nozzle for at least one second.

According to another embodiment, a dispenser includes a sprayer housing and a sprayer assembly arranged within an internal cavity of the sprayer housing. The sprayer assembly includes a pump assembly, a gearbox assembly, a nozzle configured to dispense fluid from the sprayer housing, an intake conduit that supplies fluid to an inlet of the pump chamber, and a discharge conduit. The pump assembly includes a pump having a pump chamber and a pulsation dampener having a dampener housing with an interior volume and a dampener housing opening. The gearbox assembly includes a cam assembly configured to drive the pump, an electric motor, and a transmission driven by the electric motor that is configured to drive the cam assembly. The discharge conduit provides fluid communication between each of an outlet of the pump chamber, the dampener housing opening of the pulsation dampener, and the nozzle. When the pump is activated, fluid from the outlet of the pump chamber flows within the discharge conduit to both the dampener housing opening of the pulsation dampener and through the nozzle to be emitted from the dispenser.

According to another embodiment, a dispenser includes a pump having a pump chamber, an intake conduit, a discharge conduit in fluid communication with an outlet of the pump chamber and with a nozzle, and a pulsation dampener. The pulsation dampener has a dampener housing with an interior volume and a dampener housing opening. Further, the pulsation dampener has a spring biased movable piston located in the interior volume that defines a variable volume headspace between the piston and the dampener housing opening of the pulsation dampener. The dampener housing opening is in fluid communication with the discharge conduit. The dispenser is configured to, when the pump is activated, emit a substantially constant stream of fluid from the nozzle for at least one second.

BRIEF DESCRIPTION OF THE DRAWINGS

Other aspects and advantages of the present disclosure will become apparent upon reading the following detailed description and upon reference to the drawings in which.

DETAILED DESCRIPTION

While the devices disclosed herein may be embodied in many different forms, several specific embodiments are discussed herein with the understanding that the embodiments described in the present disclosure are to be considered only exemplifications of the principles described herein, and the disclosure is not intended to be limited to the embodiments illustrated. Throughout the disclosure, the terms "about" and "approximately" mean plus or minus 5% of the number that each term precedes.

The present disclosure relates in general to continuous spray dispensers, and more particularly to continuous spray dispensers that implement a pulsation dampener for dispensing a fluid at a constant flow rate. It should be noted that while the fluids highlighted herein are described in connection with a fluid comprising a chemical composition and diluent mixture, the fluid dispensing devices disclosed herein may be used or otherwise adapted for use with any fluid, composition, or mixture.

The dispensing devices disclosed herein have enhanced performance when compared with existing dispensing systems. For example, existing dispensers commonly use single or dual reciprocating piston-type pumps or gear pumps, which are generally known in the art. Single reciprocating piston pumps generally include a piston disposed within a pump chamber, the piston being driven by a motor to intake fluid and subsequently discharge the fluid through a conduit or a nozzle. During the intake step, the piston may linearly translate away from the nozzle, thereby drawing fluid into the pump chamber. During the subsequent discharge step, the piston may be driven toward the nozzle to discharge the fluid out of the pump chamber and through the nozzle. Consequently, pressure within the pump chamber and against the nozzle varies significantly between the intake step and the discharge step. The nozzle generally experiences greater pressure during the discharge step than during the intake step, and, accordingly, the flow rate of fluid through the nozzle is not consistent.

Figure 1A:
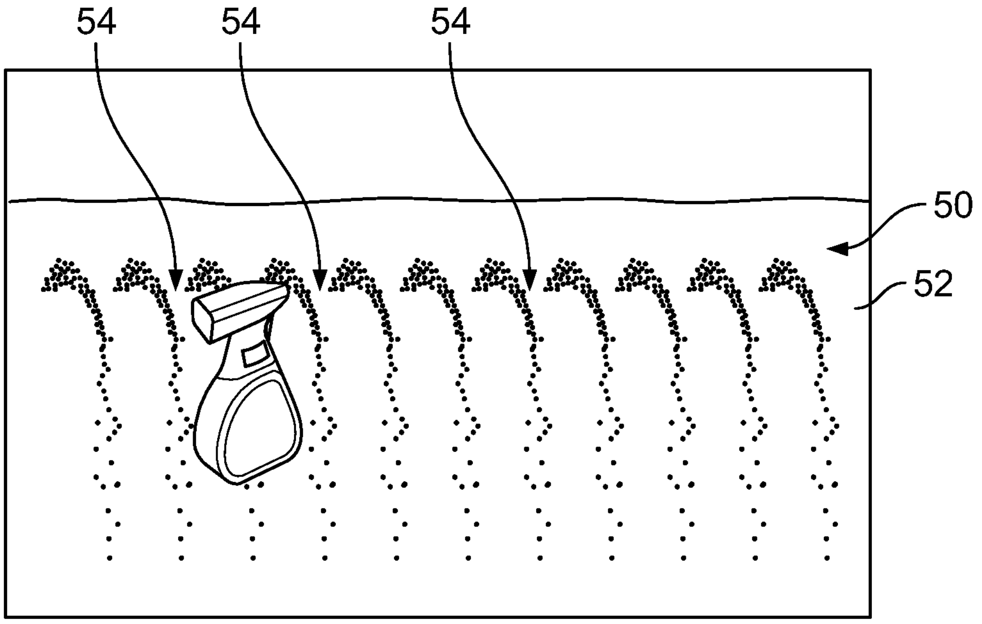
FIG. 1A (Prior Art)
FIG. 1A is a schematic view of a spray pattern that is generated by spraying a prior art dispenser.

Dual reciprocating piston pumps are designed to provide simultaneous intake and discharge steps so that when the piston draws fluid into the pump chamber, the piston concurrently discharges fluid from the pump chamber. This type of pump generally provides less fluctuation in pressure and, correspondingly, fluid flow rate. However, this type of pump still provides unsteady sprayer patterns, such as a spray pattern 50 shown applied to a spraying surface 52, as illustrated in FIG. 1A. The fluid flow out of the nozzle of the dispenser may substantially cease or diminish during the intake step, which results in a series of regions of reduce flow or drop-off regions 54. Gear pumps are known to provide a steadier fluid flow than piston pumps, but are less reliable. Therefore, while being capable and adequate for use, gear pumps are not a preferred pump type for such dispensing systems.

Figure 1B:
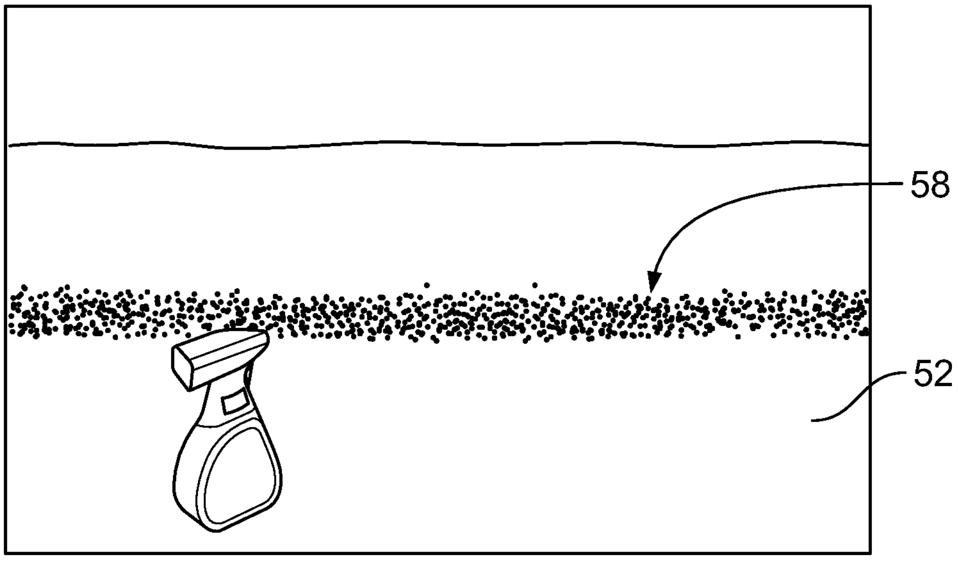
FIG. 1B is a schematic view of a spray pattern that is generated by spraying a dispenser according to the present disclosure.

The dispensing devices disclosed herein may alleviate this issue and others. Generally, the dispensing devices according to embodiments of the present disclosure utilize a pump assembly that incorporates a pulsation dampener configured to provide a substantially constant fluid flow. For example, dispensing devices according to the present disclosure may provide spray patterns such as a spray pattern 58 on the spraying surface 52 shown in FIG. 1B. The pulsation dampener used in the dispensing system is configured to reduce fluid pressure fluctuations within the pump chamber and against the nozzle to create a substantially continuous stream of fluid through the nozzle. Therefore, the dispensing devices disclosed herein exhibit enhanced dispensing control and precision when compared to other prior art dispensing devices.

As used herein, a fluid flow may be referred to as being "substantially continuous" or "substantially constant" if a flow rate of the stream of fluid remains substantially within a range that is greater than 0. For example, a substantially constant stream of fluid may have a flow rate that remains between about 1.5 milliliters per second ("ml/s") and about 4.5 ml/s. In some embodiments, a substantially constant stream of fluid may have a flow rate that remains between about 0.5 ml/s and about 5.0 ml/s, between about 1.8 ml/s and about 3.3 ml/s, or between about 2.0 ml/s and about 3.0 ml/s. A substantially continuous flow rate may remain within a particular range for a duration of time. For example, a substantially continuous stream of fluid may remain between about 1.5 ml/s and about 4.5 ml/s for at least one, three, five, eight, or ten seconds. Further, a substantially continuous stream of fluid may remain between any of the aforementioned exemplary ranges for at least one, four, six, nine, or twelve seconds.

Moreover, a stream of fluid having a substantially constant flow rate may have an amplitude that remains within a particular range, such as, e.g., 15 centimeters ("cm") or less. More specifically, embodiments of the present disclosure may provide a dispenser that is capable of emitting fluid in a direction along a longitudinal axis that is substantially collinear with a center of the nozzle onto a spraying surface. In some embodiments, if a substantially continuous stream of fluid is emitted onto a spraying surface from about one meter away for a duration of about five seconds, at least 95% of a resulting spray pattern may have an amplitude of 15 cm or less. Similarly, in some instances, if a substantially continuous stream of fluid is dispensed onto a spraying surface from about four meters away for a duration of about ten seconds or less, at least 95% of a resulting spray pattern has an amplitude of 15 cm or less. In some embodiments, at least 90% of the spray pattern has an amplitude of 12 cm or less. In some embodiments, at least 80% of the spray pattern has an amplitude 10 cm or less. Furthermore, in some embodiments, a continuous spray pattern may have a minimum amplitude that is at least 50% of a maximum amplitude of the spray pattern.

A stream of fluid may be emitted for a distance of about one meter, about two meters, about three meters, or about four meters before impacting a spraying surface, and a resulting pattern formed on the spraying surface may be measured to determine continuity. Additionally, a stream of fluid may be emitted onto a spraying surface from a first point to a second point on the surface for a duration of time before being evaluated for continuity. In some embodiments, the first point and the second point on the spraying surface may be at least one meter, at least two meters, at least three meters, or at least four meters away from each other. Generally, a resulting spray pattern is the pattern formed on a spraying surface by a stream of fluid, such as, e.g., the patterns 50, 58 shown in FIGS. 1A and 1B, respectively.

Figure 2:
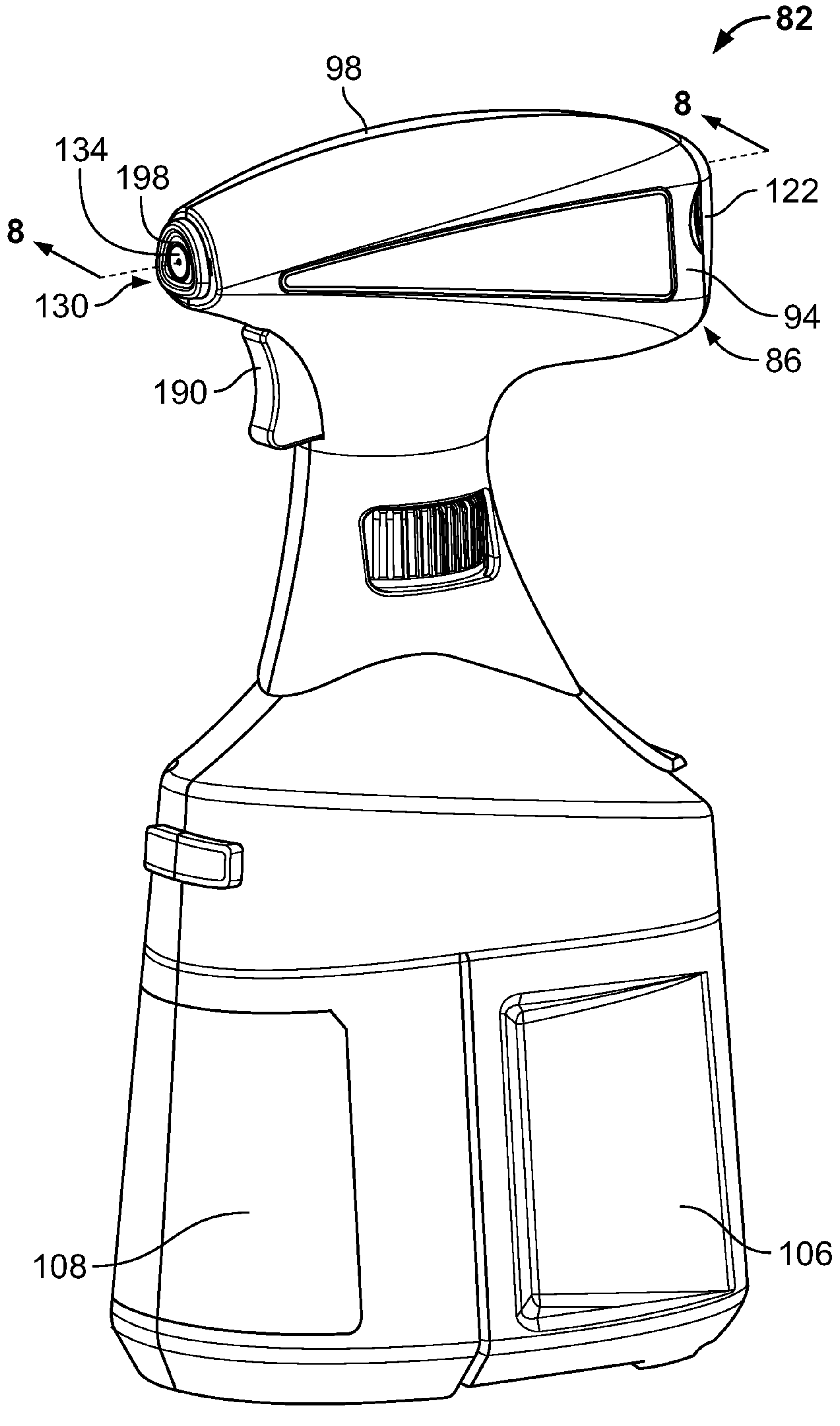
FIG. 2 is a front, top, and left side isometric view of a dispenser according to the present disclosure.
Figure 3:
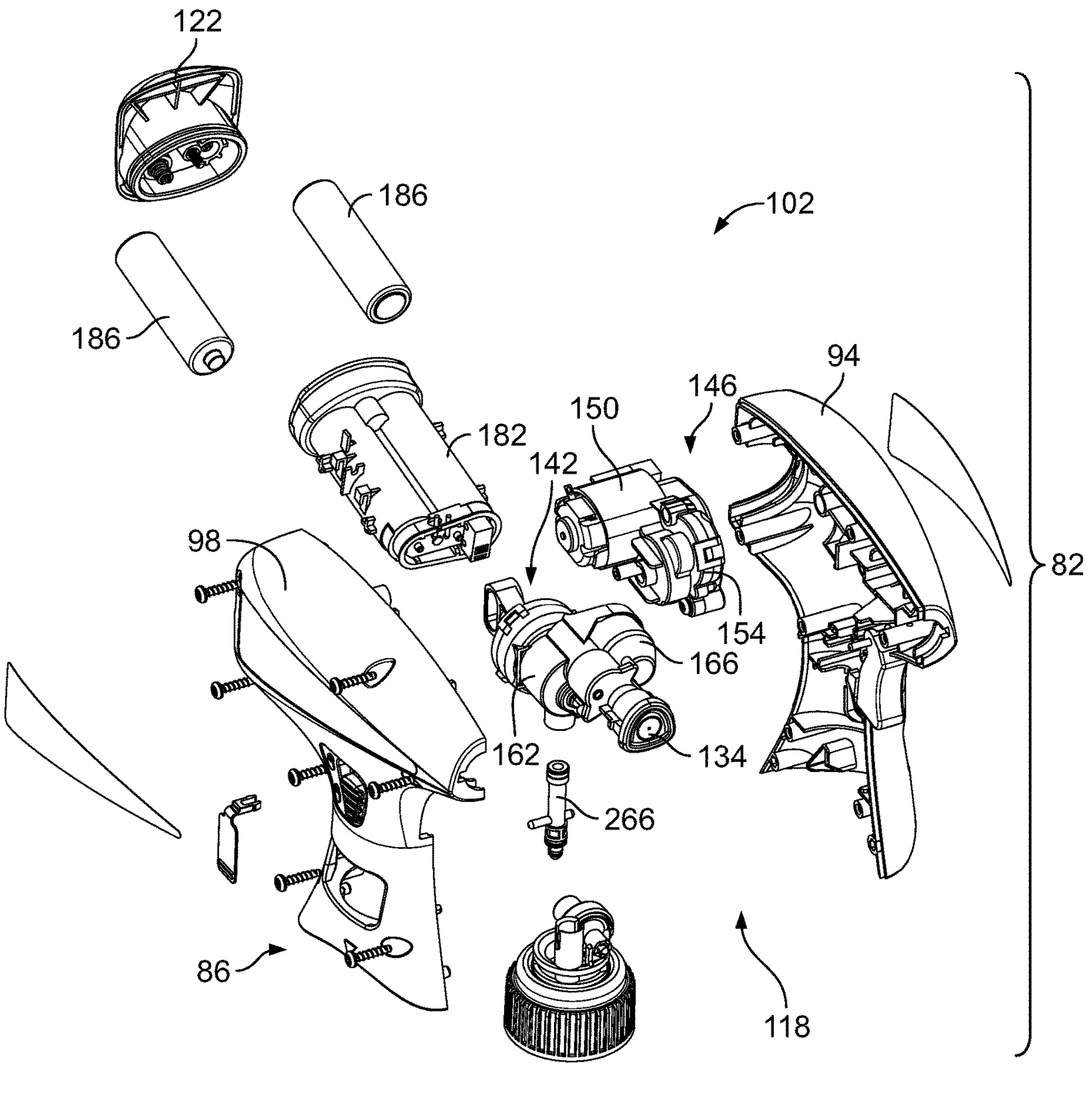
FIG. 3 is an exploded, isometric view of a sprayer housing with a sprayer assembly for use in the dispenser of FIG. 2.

FIGS. 2-15 illustrate a dispensing device 82 and various components of the dispensing device 82, according to an embodiment of the present disclosure. Referring particularly to FIG. 2, the dispensing device 82 generally includes a sprayer housing 86 including a first shell 94 and a second shell 98 that can be fastened together with screws or another suitable fastening device. As used herein, the dispensing device 82 may also be referred to as a dispenser, dispensing system, fluid application system, dispensing mechanism, sprayer device, for example. As shown in FIG. 3, the sprayer housing 86 surrounds a sprayer assembly 102 that is configured to provide continuous fluid flow and will be described in detail below.

Referring to FIG. 2, the dispensing device 82 may be configured for use with a diluent reservoir 106 that may be configured to hold a diluent, such as, e.g., water. In some embodiments, a diluent may be a fluid having a viscosity less than about 1.7 millipascal-second ("mPa-s"), less than about 1.5 mPa-s, less than about 1.2 mPa-s, less than about 1.1 mPa-s, or less than about 1.0 mPa-s, the viscosity being taken at temperature of about 20° C. Further, the dispensing device 82 may be configured to mix a chemical concentrate with a diluent, the chemical concentrate being held within a chemical concentrate container 108. The diluent reservoir 106 and the chemical concentrate container 108 may be substantially similar to the diluent reservoir and the chemical concentrate container disclosed in U.S. Pat. No. 9,192,949 to Lang et al., the entirety of which is incorporated by reference herein. Any fluid suitable for diluting a concentrated liquid chemical can be used as the diluent. The diluent reservoir 106 can be formed from a suitable material such as a polymeric material, e.g., polyethylene or polypropylene. The concentrate can be selected such that when the concentrate is diluted with the diluent, any number of different fluid products is formed. Non-limiting example products include general purpose cleaners, kitchen cleaners, bathroom cleaners, dust inhibitors, dust removal aids, floor and furniture cleaners and polishes, glass cleaners, anti-bacterial cleaners, fragrances, deodorizers, soft surface treatments, fabric protectors, laundry products, fabric cleaners, fabric stain removers, tire cleaners, dashboard cleaners, automotive interior cleaners, and/or other automotive industry cleaners or polishes, or even insecticides.

Still referring to FIG. 2, the chemical concentrate container 108 can be formed from a suitable material such as a polymeric material, e.g., polyethylene or polypropylene, and in some embodiments, the chemical concentrate container 108 comprises a transparent material that allows the user to check the level of chemical concentrate in the chemical concentrate container 108. It should be appreciated that the term "chemical" when used to describe the concentrate in the chemical concentrate container 108 can refer to one compound or a mixture of two or more compounds. Alternatively, the sprayer assembly 102 disclosed herein may be coupled to any fluid-containing reservoir and configured to dispense the fluid. To that end, the present disclosure is not limited to the diluent reservoir incorporated above; rather, the dispensing device 82 may be adapted to be coupled to any fluid-containing reservoir for dispensing the fluid contained in the reservoir. In some embodiments, the fluid has a viscosity of about 1.7 mPa-s, about 1.5 mPa-s, about 1.3 mPa-s, about 1.2 mPa-s, about 1.1 mPa-s, or about 1.0 mPa-s. Further, in some embodiments, the fluid has a viscosity less than about 1.7 mPa-s, less than about 1.5 mPa-s, less than about 1.3 mPa-s, less than about 1.2 mPa-s, less than about 1.1 mPa-s, or less than about 1.0 mPa-s. In some embodiments, the fluid may have a viscosity between about 0.5 mPa-s and about 1.1 mPa-s, between about 0.9 mPa-s and about 1.7 mPa-s, or between about 0.8 mPa-s and about 1.1 mPa-s.

Figure 4A:
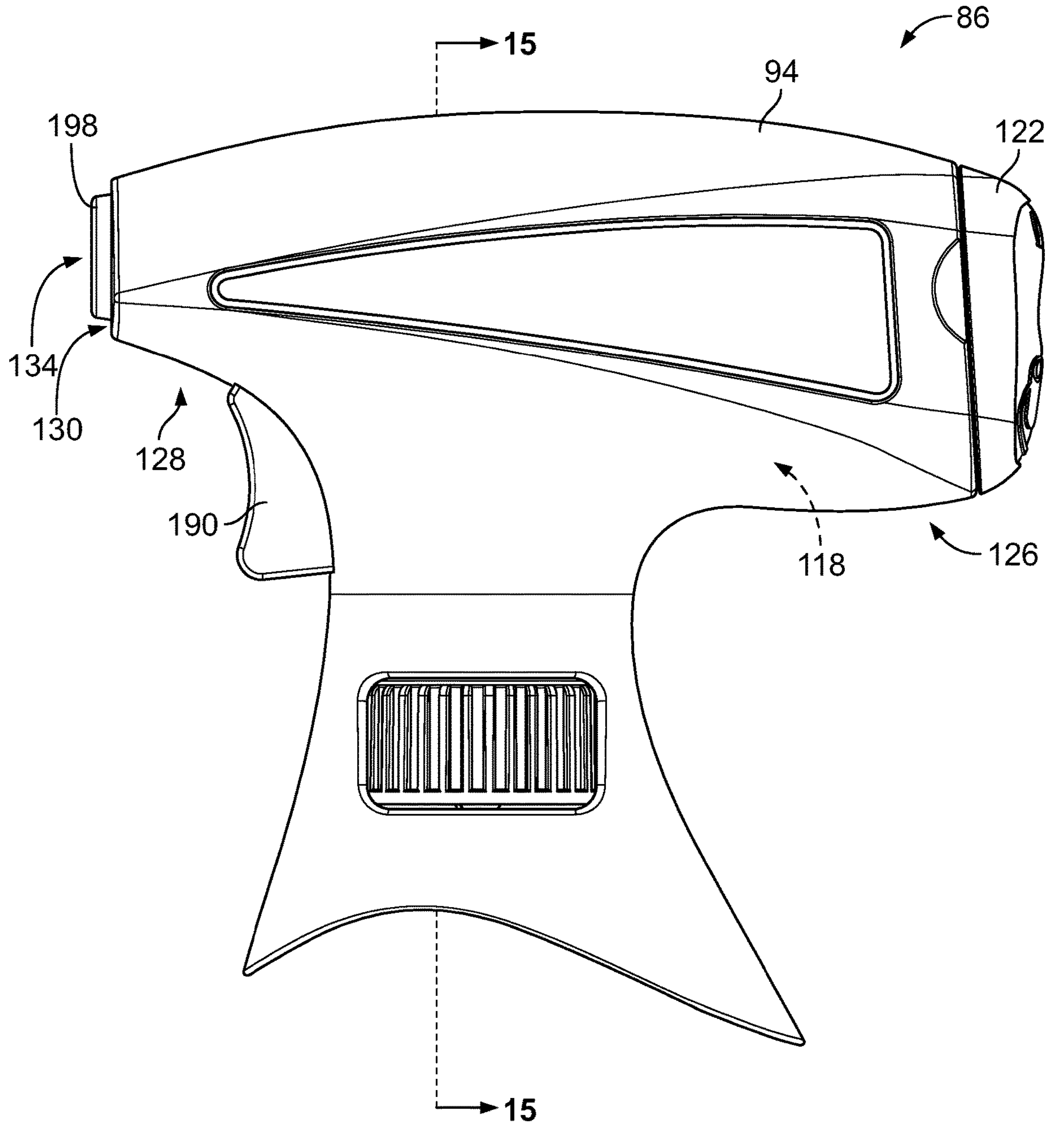
FIG. 4A is a left side elevational view of the sprayer housing of FIG. 3.
Figure 4B:
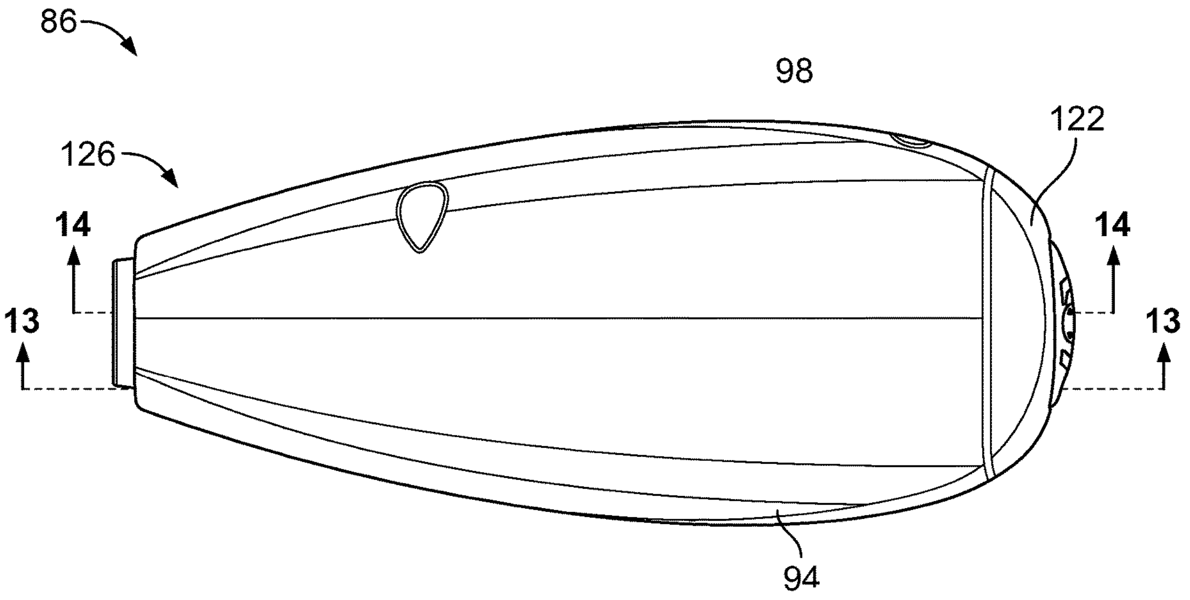
FIG. 4B is a top plan view of the sprayer housing of FIG. 3.

Referring again to FIG. 3, the sprayer housing 86 includes the first shell 94 and the opposing second shell 98. The first shell 94 and the second shell 98 may be mirror images of one another such that the sprayer housing 86 is substantially symmetrical. In some embodiments, the first and second shells 94, 98 may have complementary or similar shapes, but may have different design features. Further, the first and second shells 94, 98 are configured to attach to one another to define an internal cavity 118 that may contain the sprayer assembly 102 therein. The first and second shells 94, 98 may be connected via press-fit, fasteners, adhesives, integrally formed latches, snaps, or the like. The sprayer housing 86 may additionally include a rear shell cap 122 that may be attached to the first and second shells 94, 98 to assist in defining the internal cavity 118. Referring to FIG. 4A, removal of the rear shell cap 122 may permit access to the internal cavity 118 at a rear end 126 of the sprayer housing 86 while the first shell 94 is still connected to the second shell 98. At a front end 128 of the sprayer housing 86 opposite the rear end 126, the first and second shells 94, 98 may define a nozzle opening 130 that is configured to receive and/or retain a nozzle 134.

Figure 5:
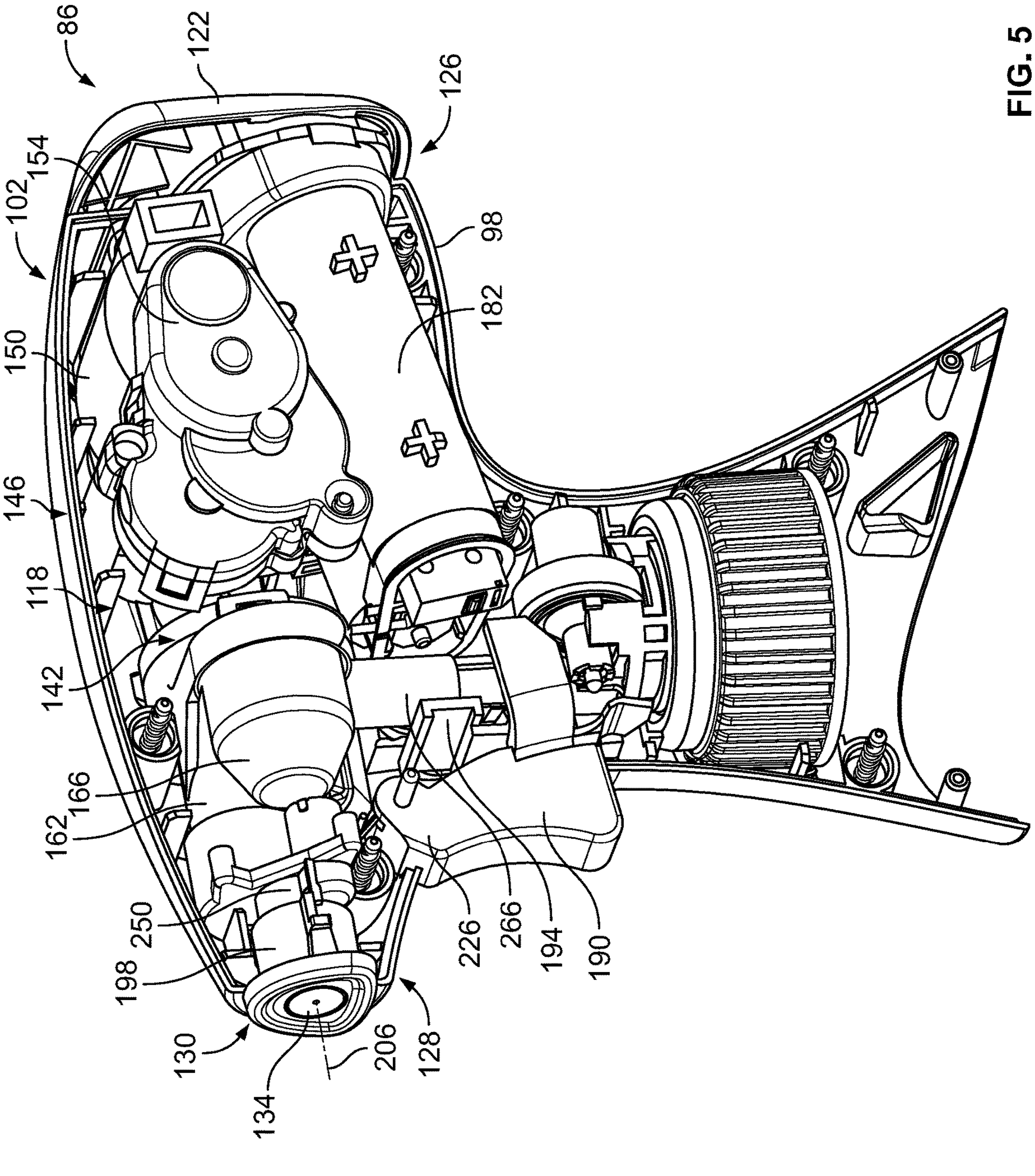
FIG. 5 is a front, top, left side isometric view of the sprayer assembly and the sprayer housing of FIG. 3 with a first shell of the housing removed.

Referring now to FIG. 5, the sprayer assembly 102 that is disposed within the sprayer housing 86 includes a pump assembly 142 and a gearbox assembly 146. The gearbox assembly 146 comprises an electric motor 150 and a transmission 154, whereas the pump assembly 142 includes a pump 162, the nozzle 134, and a pulsation dampener 166. The motor 150 includes a drive gear, and the transmission 154 includes a series of gears (not shown). A cam follower 174 and a cam follower shaft 178 (see FIG. 6) are also provided with the gearbox assembly 146 for driving the pump assembly 142. A battery box 182 that is configured to hold one or more batteries 186 (see FIG. 3), such as, e.g., AA or AAA-type batteries, is additionally provided to power the motor 150. Each of these components may be arranged within the sprayer housing 86 in a variety of configurations. However, FIG. 5 illustrates a preferred arrangement according to the present embodiment. As shown, the battery box 182 is provided adjacent the motor 150, and the pump 162 is disposed between the nozzle 134 and the motor 150. A trigger 190 is arranged proximate the nozzle 134 and is configured to contact a microswitch 194 when depressed. In some embodiments, the battery box 182 may be arranged between the pump assembly 142 and the motor 150. In some embodiments, the motor 150 may be arranged adjacent the pump assembly 142 and proximate the front end 128 of the housing 86. Furthermore, in some embodiments, the pump assembly 142 may be disposed between the battery box 182 and the motor 150.

Figure 6:
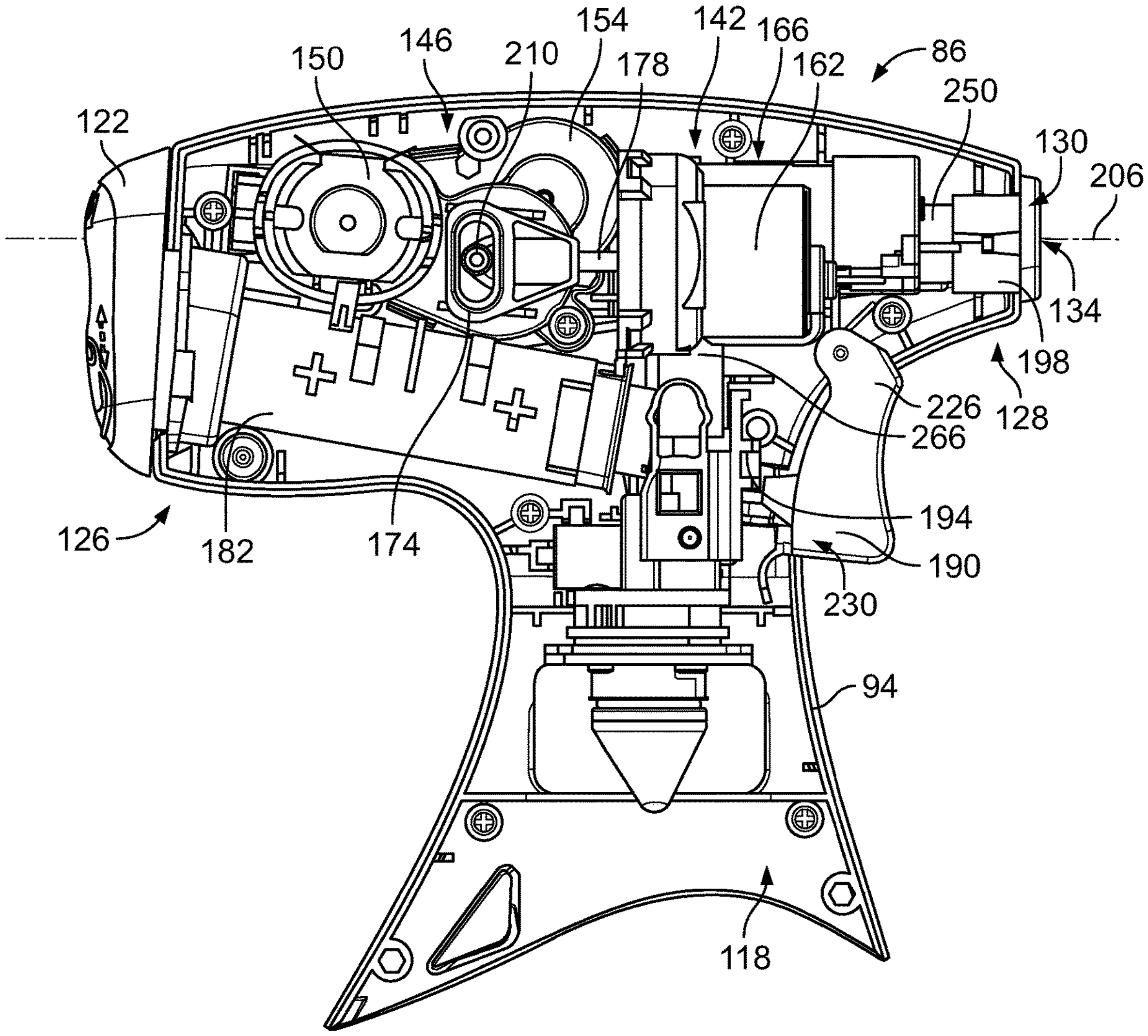
FIG. 6 is a right side elevational view of the sprayer assembly and the sprayer housing of FIG. 3 with a second shell of the housing removed.

Still referring to FIG. 5, when assembled in the sprayer housing 86, the pump assembly 142, which includes the nozzle 134 and a nozzle cover 198, is arranged proximate the front end 128 of the sprayer housing 86 such that the nozzle cover 198 protrudes into or through the nozzle opening 130 defined by the sprayer housing 86. Turning now to FIG. 6, in the assembled configuration, a center of the nozzle 134 defines a longitudinal axis 206, the longitudinal axis 206 being collinear with the center of the nozzle 134, and the pump assembly 142 is arranged along the longitudinal axis 206, extending from the nozzle opening 130 toward the rear end 126 of the sprayer housing 86. Generally, the dispensing device 82 may be configured to dispense the fluid in a direction along the longitudinal axis 206. The motor 150, which is provided with the gearbox assembly 146, is arranged adjacent the pump assembly 142, between the pump assembly 142 and the rear shell cap 122 of the sprayer housing 86, and similarly disposed along the longitudinal axis 206. Referring to FIG. 6, a push rod 210 of the gearbox assembly 146 is coupled to the cam follower 174 of the pump assembly 142 so that, when the gearbox assembly 146 is driven by the motor 150, the push rod 210 drives the cam follower 174 to operate the pump 162, i.e., drive a piston.

Figure 7:
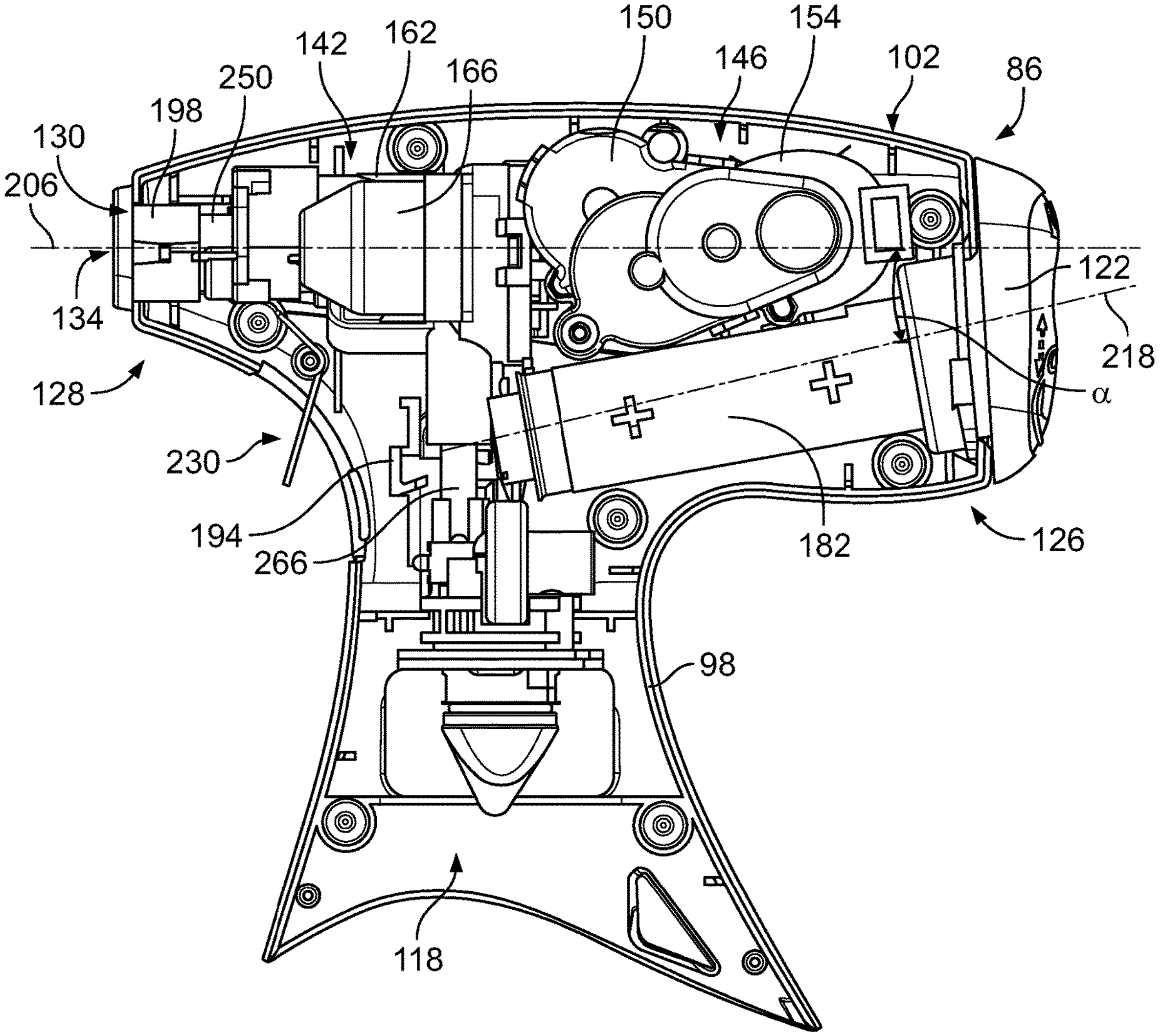
FIG. 7 is a left side elevational view of the sprayer assembly and the sprayer housing of FIG. 3 with a first shell of the housing and a trigger removed.

Referring to FIG. 7, the battery box 182 is arranged adjacent the motor 150 and gearbox assembly 146 so that it extends from proximate the pump assembly 142 toward the rear side of the sprayer housing 86. In the illustrated embodiment, the battery box 182 is an elongate body that is arranged substantially along axis 218 that is disposed at an angle α relative to the longitudinal axis 206. In some embodiments, the angle α may be between about 5 degrees and about 50 degrees. In some embodiments, the angle α may be between about 10 degrees and about 25 degrees. In some embodiments the angle α may be about 8 degrees, about 12 degrees, about 15 degrees, about 18 degrees, or about 20 degrees. Alternatively, in some embodiments, the battery box 182 may be arranged substantially parallel to the longitudinal axis 206, i.e., the angle α is about zero degrees.

Figure 8:
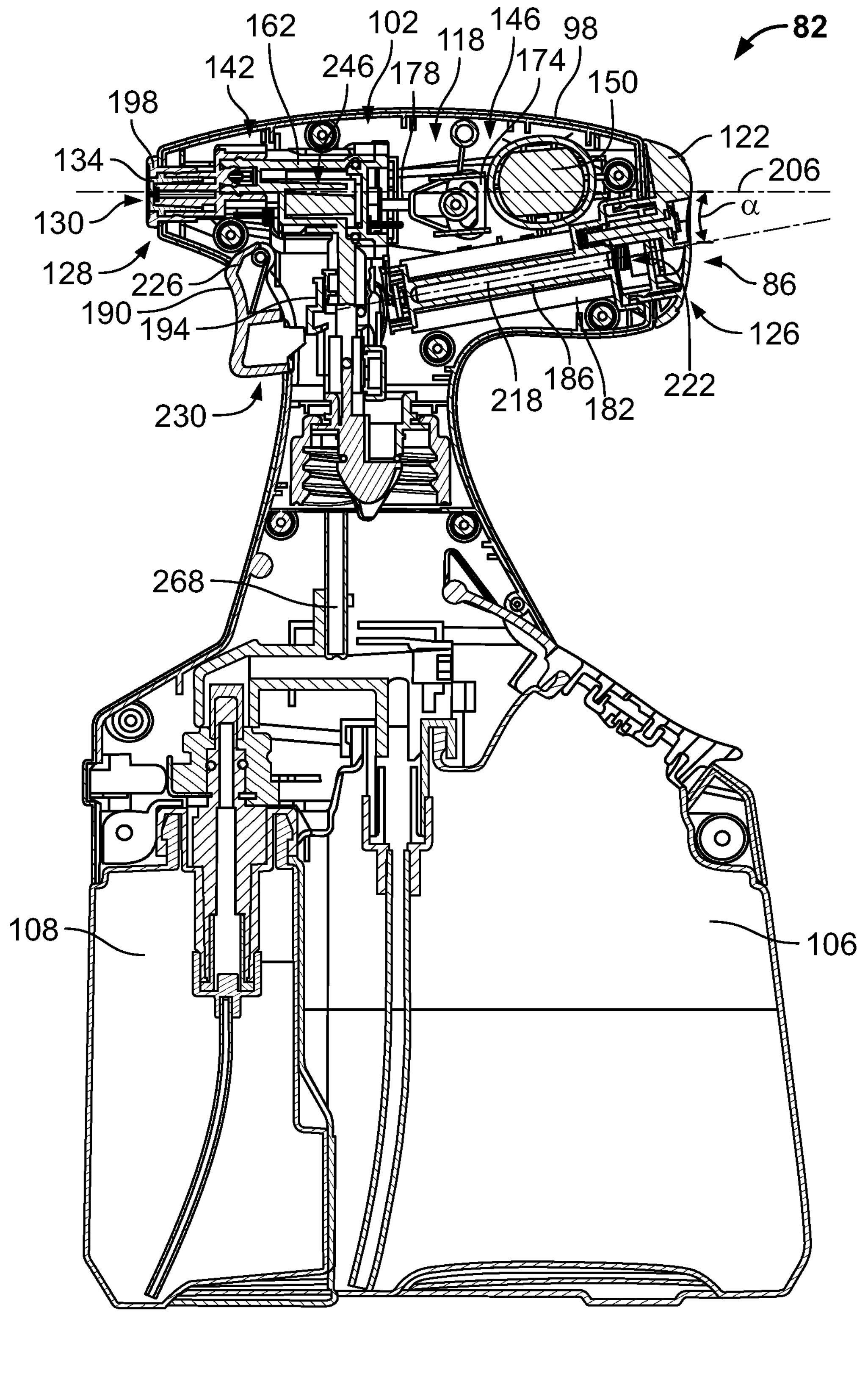
FIG. 8 is a cross-sectional view of the dispenser of FIG. 2 taken along line 8-8.

Referring to FIG. 8, the battery box 182 is a generally hollow body having an insertion opening 222 that faces the rear end 126 of the sprayer housing 86 configured for receiving the batteries 186. Generally, the battery box 182 is disposed proximate the rear end 126 of the sprayer housing 86 such that when the rear shell cap 122 of the sprayer housing 86 is removed, batteries 186 can be inserted into and/or removed from the battery box 182. A length of the battery box 182 measured along the axis 218 may be no more that 50% of a length of the sprayer housing 86 measured along the longitudinal axis 206. In some embodiments, the length of the battery box 182 may be no more than 30%, 40%, 60%, or 70% of the length of the sprayer housing 86.

Still referring to FIG. 8, the trigger 190 is hingedly attached to the sprayer housing 86 proximate the pump assembly 142. More specifically, the trigger 190 is hingedly attached at a first end 226 thereof such that it is disposed within a trigger opening 230 defined by the sprayer housing 86, i.e., defined between the first shell 94 (not shown in FIG. 8) and the opposing second shell 98. Therefore, the trigger 190 may be depressed into the sprayer housing 86 to contact the microswitch 194. When contacted by the trigger 190, the microswitch 194 may permit the flow of electricity from the batteries 186 to the motor 150 to operate the pump 162, which will be described in greater detail below. More specifically, the motor 150, by way of the transmission 154 and the push rod 210, drives the cam follower 174, which, in turn, reciprocates a piston 242 (see FIG. 11) within a pump chamber 246 of the pump 162 to draw fluid into the pump chamber 246 and then expel the fluid from the nozzle 134.

Sprayer assemblies according to embodiments of the present disclosure are generally configured for use in hand-held dispensing systems. Therefore, sprayer assemblies according to embodiments of the present disclosure, such as the sprayer assembly 102 shown in FIG. 5, may have size limitations. For example, and referring again to FIG. 5, the components of the sprayer assembly 102 must be arranged and sized so that they may fit within the sprayer housing 86. In the illustrated embodiment, the sprayer housing 86 defines the internal cavity 118 having a volume of about 150 cubic centimeters ("$cm^3$"). In some embodiments, the internal cavity 118 may have a volume of about 125 $cm^3$, about 170 $cm^3$, about 190 $cm^3$, or about 200 $cm^3$. Further, in some embodiments, the internal cavity 118 may be no greater than about 225 $cm^3$, about 250 $cm^3$, or about 300 $cm^3$.

Correspondingly, the components of the sprayer assembly 102 must fit within the internal cavity 118 and, thus, must occupy a volume less than the volume of the internal cavity 118. The sprayer assembly 102 thus may have a volume of about 90 $cm^3$. Alternatively, the sprayer assembly 102 may occupy a volume of about 65 $cm^3$, about 78 $cm^3$, about 85 $cm^3$, about 96 $cm^3$, about 125 $cm^3$, about 142 $cm^3$, or about 164 $cm^3$ in some embodiments. Further, in some embodiments, the sprayer assembly 102 may occupy a volume no greater than about 88 $cm^3$, about 100 $cm^3$, about 112 $cm^3$, or about 200 $cm^3$. The volume of the sprayer assembly may be between about 65 $cm^3$ and about 105 $cm^3$, between about 70 $cm^3$ and about 88 $cm^3$, between about 80 $cm^3$ and about 92 $cm^3$, or between about 100 $cm^3$ and about 150 $cm^3$.

Each of the components of the sprayer assembly 102 may accordingly have volume limits. For example, in some embodiments, the pump assembly 142, which includes the pump 162 and the pulsation dampener 166, may have a volume of about 35 $cm^3$, about 48 $cm^3$, or about 58 $cm^3$. In some embodiments, the pump assembly 142 may have a volume of between about 25 $cm^3$ and about 50 $cm^3$, between about 28 $cm^3$ and about 46 $cm^3$, or between about 32 $cm^3$ and about 45 $cm^3$. In some embodiments, the pump assembly 142 may occupy no more than 25% of the volume of the internal cavity 118. Furthermore, in some embodiments, the pump assembly 142 may occupy no more than about 15%, about 30%, about 35%, about 45%, about 48%, about 50%, or about 60% of the volume of the internal cavity 118. The pump assembly 142 and the gearbox assembly 146, which includes the motor 150 and the transmission 154, combined may occupy a volume of about 60 $cm^3$, about 74 $cm^3$, or about 80 $cm^3$.

In some embodiments, the pump assembly 142 and the gearbox assembly 146 may collectively occupy no more than 40% of the volume of the internal cavity 118. Moreover, in some embodiments, the pump assembly 142 and the gearbox assembly 146 together may occupy no more than about 35%, about 47%, about 54%, about 63%, about 75%, or about 80% of the volume of the internal cavity 118. Components of the sprayer assembly 102 may similarly have a footprint limit. For example, in some embodiments, the pump assembly 142 including the pump 162 and the pulsation dampener 166, and the gearbox assembly 146 including the motor 150 and the transmission 154 are disposed entirely within a footprint of about 72 $cm^3$. In some embodiments, the footprint may be about 60 $cm^3$, about 75 $cm^3$, about 80 $cm^3$, or about 84 $cm^3$. Moreover, the pump assembly 142 and the gearbox assembly 146 may be disposed entirely within a footprint of less than about 70 $cm^3$, about 73 $cm^3$, about 78 $cm^3$, about 82 $cm^3$, about 90 $cm^3$, or about 100 $cm^3$.

Turning again to FIG. 7, when assembled, a longitudinal length of the gearbox assembly 146 taken along the longitudinal axis 206 must be less than a longitudinal length of the sprayer housing 86 measured along the longitudinal axis 206. In some embodiments, the longitudinal length of the gearbox assembly 146 may be less than about 30%, about 40%, about 50%, about 60%, or about 70% of the longitudinal length of the sprayer housing 86. In some embodiments, the longitudinal length of the gearbox assembly 146 may be between about 20% and about 45% of the longitudinal length of the sprayer housing 86. Likewise, a longitudinal length of the pump assembly 142 measured along the longitudinal axis 206 must be less than the longitudinal length of the sprayer housing 86 along the longitudinal axis 206. In some embodiments, the longitudinal length of the pump assembly 142 is less than about 30%, about 40%, about 50%, about 60%, or about 70% of the length of the sprayer housing 86. In some embodiments, the longitudinal length of the pump assembly 142 may be between about 20% and about 55% of the longitudinal length of the sprayer housing 86. In combination, a longitudinal length of the gearbox assembly 146 and the pump assembly 142 similarly must be less than the longitudinal length of the sprayer housing 86. In some embodiments, the longitudinal length of the gearbox assembly 146 and the pump assembly 142 collectively may be between about 50% and about 80%, about 60% and about 90%, or about 70% and 100% of the longitudinal length of the sprayer housing 86.

Figure 10:
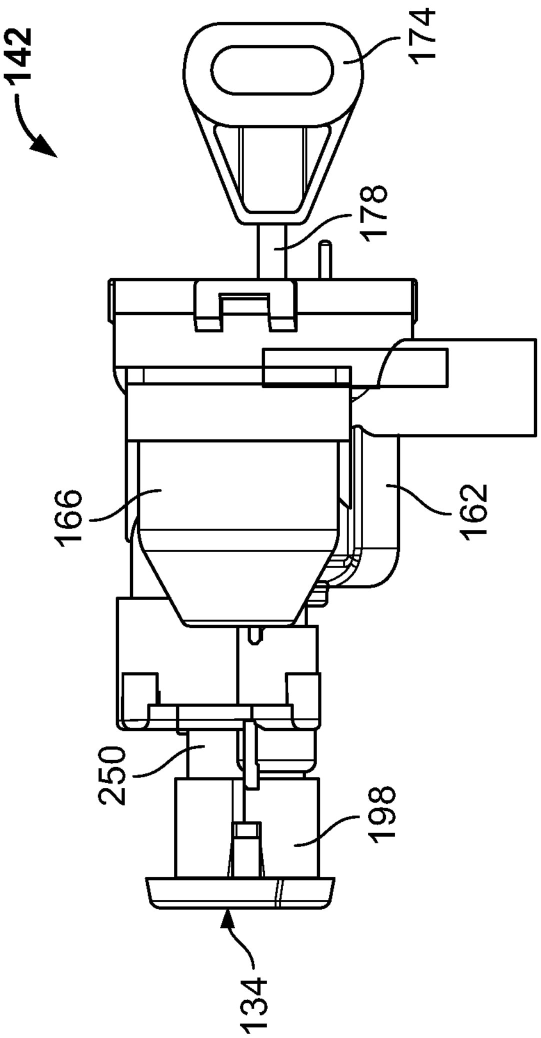
FIG. 10 is a left side elevational view of the pump assembly of FIG. 9.
Figure 9:
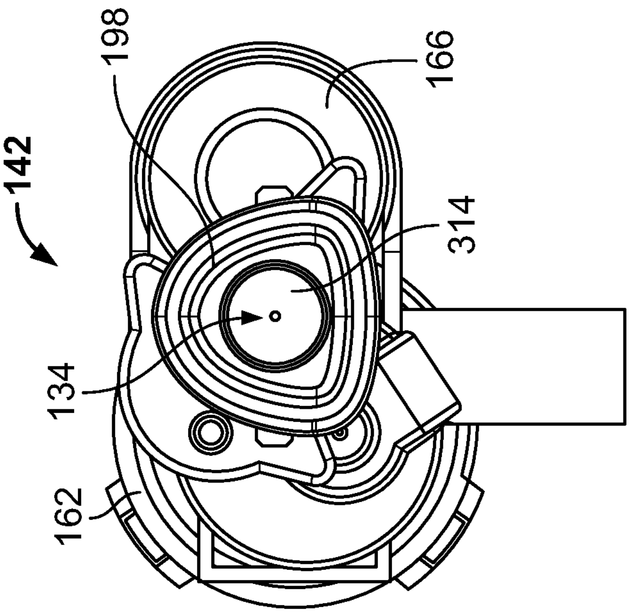
FIG. 9 is a front elevational view of a pump assembly for use in the dispenser of FIG. 2.
Figure 11:
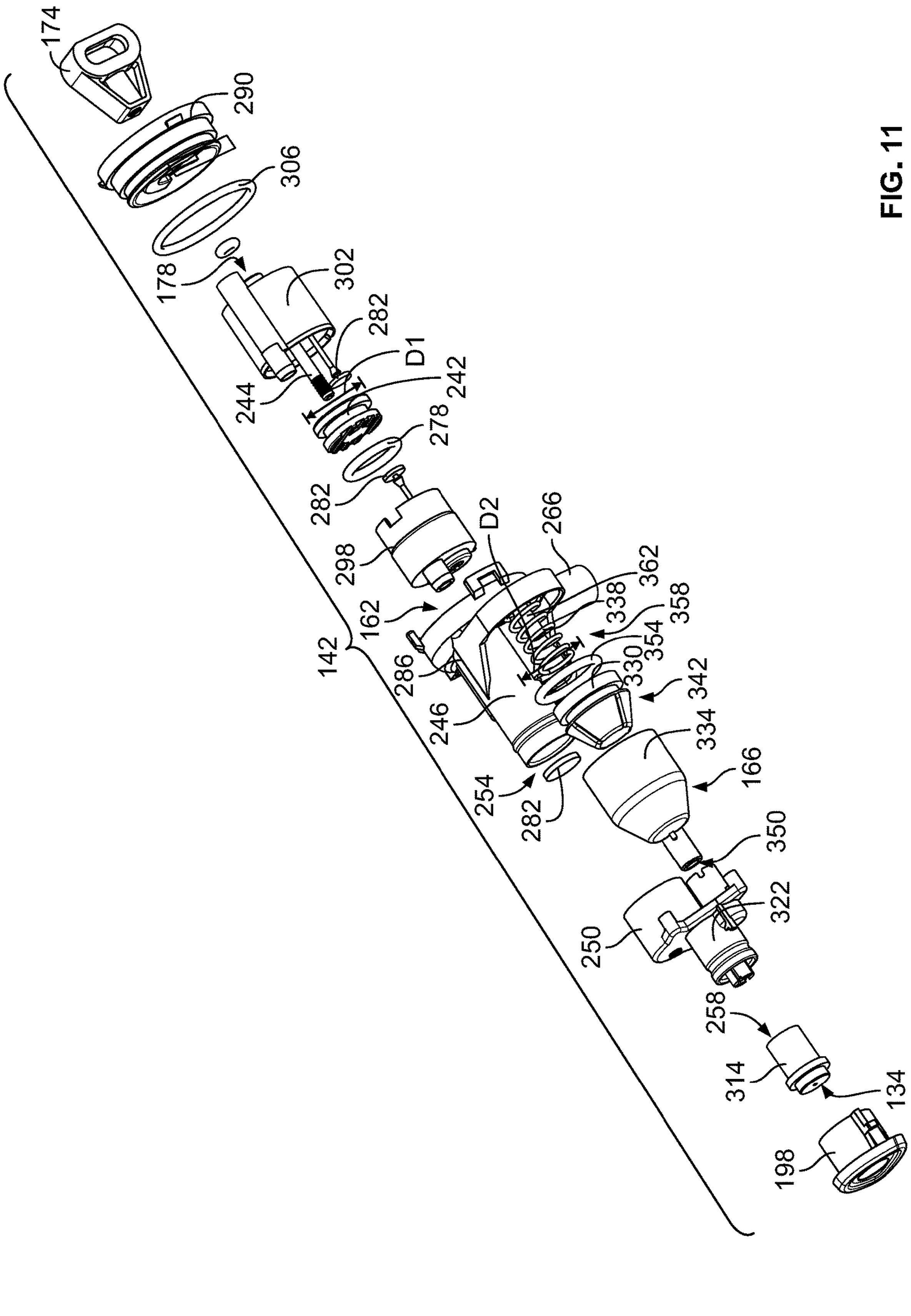
FIG. 11 is an exploded view of the pump assembly of FIG. 10.
Figure 12:
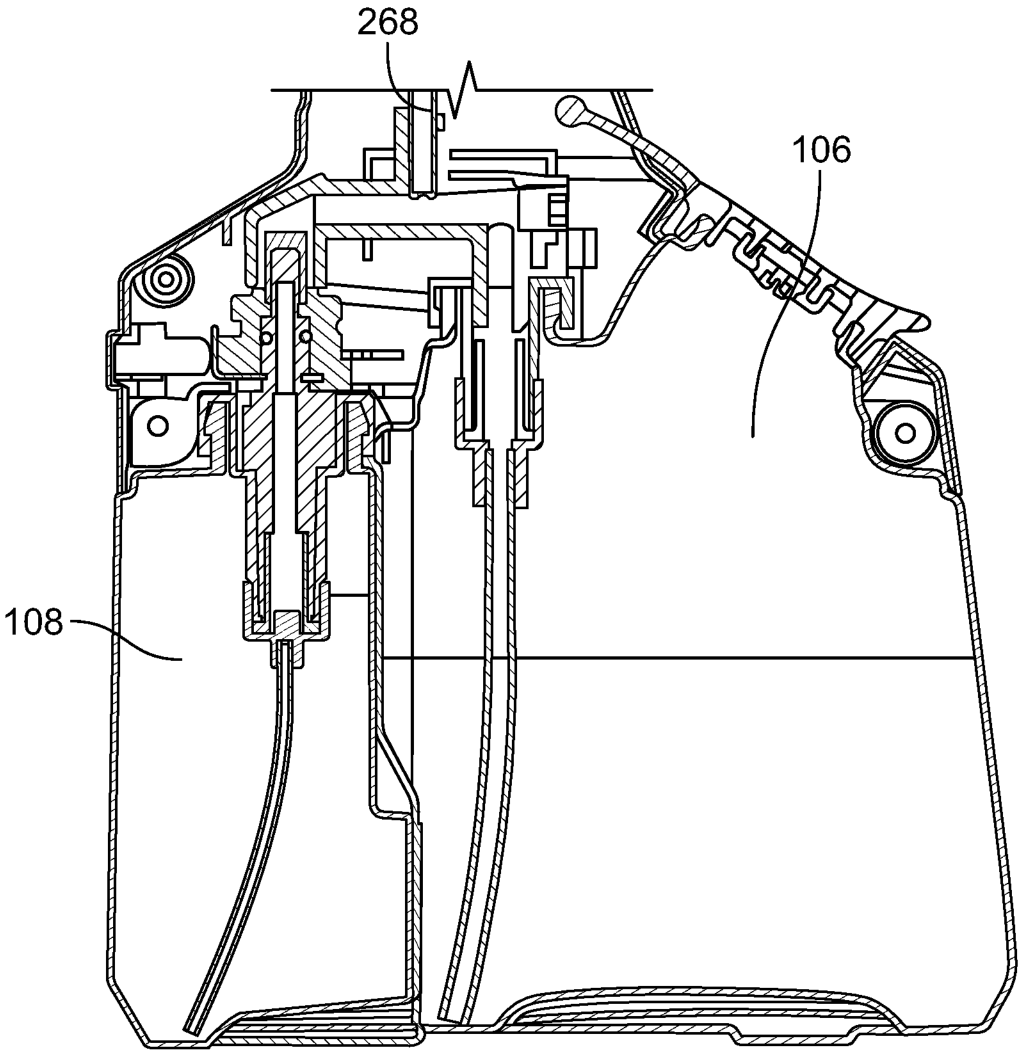
FIG. 12 is a partial cross-sectional view of the dispenser of FIG. 8.

Referring now to FIGS. 9-11, the pump assembly 142 is shown in greater detail. Referring specifically to FIG. 11, the pump assembly 142 includes the pump 162 having the piston 242 that is linearly displaceable within the pump chamber 246, e.g., a pump cylinder. The pump chamber 246 defines an inside diameter D1 (see also FIGS. 14 and 15) and is in fluid communication with a discharge conduit 250, which is in fluid communication with the nozzle 134. The inside diameter D1 of the pump 162 may also be referenced as the inside diameter D1 of the pump piston 242. Generally, the discharge conduit 250 is in fluid communication with an outlet 254 of the pump chamber 246 and with an inlet 258 of the nozzle 134 through which the fluid can be dispensed when the pump 162 is activated. Similarly, the pump chamber 246 is in fluid communication with a pump supply conduit 266 that is placed in fluid communication with a fluid supply conduit 268 (see FIG. 12) by way of a sprayer connector, which is further described in U.S. Pat. No. 8,403,183 to Fahy et al., which is incorporated herein by reference in its entirety. Therefore, as will be described in greater detail below, the piston 242 is configured to linearly move within the pump chamber 246 to intake and discharge fluid through the pump supply conduit 266 and the discharge conduit 250, respectively. An external O-ring 278 is provided around the piston to assist in clearing the pump chamber 246. The O-ring 278 enhances the pump suction to draw in and push out the fluid being dispensed. Although one O-ring is depicted, it should be understood that other embodiments can use a different number of O-rings.

Still referring to FIG. 11, in addition to the piston 242 and the O-ring 278 disposed within the pump chamber 246, the pump assembly 142 further includes a plurality of valves 282 and the cam follower 174. Further, the pump assembly 142 has a main pump housing 286 that may receive and house components of the pump 162, in addition to a pump cover 290 that may be attached to the main pump housing 286. The pump 162 may further include a first pump body 298 and a second pump body 302 that retain the piston 242 and its shaft 244, the first and second pump bodies 298, 302 being configured for insertion into the main pump housing 286. A housing O-ring 306 may be utilized to provide a seal between the main pump housing 286 and the pump cover 290. Furthermore, the nozzle 134, which includes a nozzle orifice 314, and the nozzle cover 198 may be provided for attachment to a nozzle body 322 that couples to the pump 162 and the pulsation dampener 166. The assembled pump assembly 142 is shown in FIGS. 9 and 10.

Still referring to FIG. 11, the pump 162 may be a single or dual reciprocating piston-type pump, which are generally known in the art. Thus, the typical operation of this pump type is known; however, for purpose of description, an overview is provided below. Generally, in the instance of a single reciprocating piston pump, the pump 162 is driven by the motor 150 via the transmission 154 and the push rod 210. The push rod 210 is configured to drive the piston 242 of the pump 162 between an intake step and a discharge step. During the intake step, the piston 242 may linearly translate away from the nozzle 134, thereby drawing fluid, via the pump supply conduit 266, into the pump chamber 246. During the subsequent discharge step, the push rod 210 drives the piston 242 toward the nozzle 134, thereby discharging the fluid, via the discharge conduit 250, out of the pump chamber 246 and through the nozzle 134.

Consequently, in instances where the pump 162 operates without a pulsation dampener, pressure within the pump chamber 246 and against the nozzle 134 naturally varies significantly between the intake step and the discharge step. More specifically, in the absence of a pulsation dampener the nozzle 134 experiences greater fluid pressure during the discharge step than during the intake step. Furthermore, fluid flow through the nozzle 134 is not continuous. Rather, fluid flow out of the nozzle 134 ceases or is diminished during the intake step, similar to the spray pattern 50 previously discussed in connection with FIG. 1A. A dual reciprocating piston-type pump operates substantially similarly to the single reciprocating piston-type pump described above.

However, rather than having a single pump chamber with an intake step and a discharge step, the pump 162 may have concurrent intake and discharge steps. That is, as the piston 242 draws fluid into the chamber 246 through a first inlet, it may be discharging fluid through a first outlet. As the fluid is being discharge through a second outlet, fluid may be drawn into the pump chamber 246 via a second inlet. Thus, the piston 242 may divide the chamber into two regions that each draw in and discharge fluid in opposing steps. The use of a dual reciprocating piston-type pump diminishes pulsation and create a steadier, more continuous fluid flow than a single reciprocating piston-type pump. However, dual reciprocating piston-type pumps still experience at least some fluid flow cessation, like the regions of reduced flow 54 shown in FIG. 1A. Thus, embodiments of the present disclosure are generally designed to diminish pressure fluctuations within the pump chamber 246 and mitigate fluid flow irregularities that are typically experienced by existing dispenser systems by incorporating the pulsation dampener 166. The pulsation dampener 166 is designed to decrease or diminish flow stalling or reduction that occurs when the pump 162 is operating.

Referring particularly to FIG. 11, the pulsation dampener 166 of the pump assembly 142 includes a dampener piston 330 that is linearly displaceable within a dampener housing 334 using a dampener spring 338, thereby defining a variable volume headspace 342 within the dampener housing 334. The dampener piston 330 and the dampener spring 338 are used to dampen pressure increases during the intake step of the pump 162 by moving within the dampener housing 334 to change the volume of the headspace 342. In some embodiments, a maximum volume of the headspace 342 is in a range of about 2.0 milliliters ("ml") and about 6.0 ml. In some embodiments, the maximum volume of the headspace 342 may be between about 1.0 ml and 6.5 ml, between about 3.0 ml and 5.0 ml, or between about 3.5 ml and 4.5 ml. Furthermore, the variable volume headspace 342 may have an average volume of about 2.5 ml, about 2.8 ml, about 3.4 ml, about 3.7, or about 4.2 ml. In some embodiments, the average volume of the headspace 342 may be between about 0.5 ml and about 3.5 ml, between about 1.2 ml and about 3.2 ml, or between about 1.5 ml and about 3.0 ml. The variable volume headspace 342 additionally may have a minimum volume of about 0.2 ml, about 0.4 ml, about 0.8 ml, about 1.0 ml, or about 1.4 ml. The minimum volume in some embodiments may be less than about 0.5 ml, about 0.7 ml, about 1.0 ml, or about 1.5 ml. A deflection of the dampener spring is related to the maximum volume of the headspace 342. In some embodiments, a maximum deflection of the dampener spring is about 3.5 mm, about 4.0 mm, about 4.5 mm, about 5.0 mm, or about 5.5 mm. In some embodiments, the maximum deflection is between about 3.5 mm and about 4.5 mm, between about 4.0 mm and about 5.0 mm, or between about 4.5 mm and about 5.5. Further, in some embodiments, the maximum deflection is no greater than about 3.8 mm, about 4.3 mm, about 4.8 mm, about 5.2 mm, or about 5.6 mm.

Figure 13:
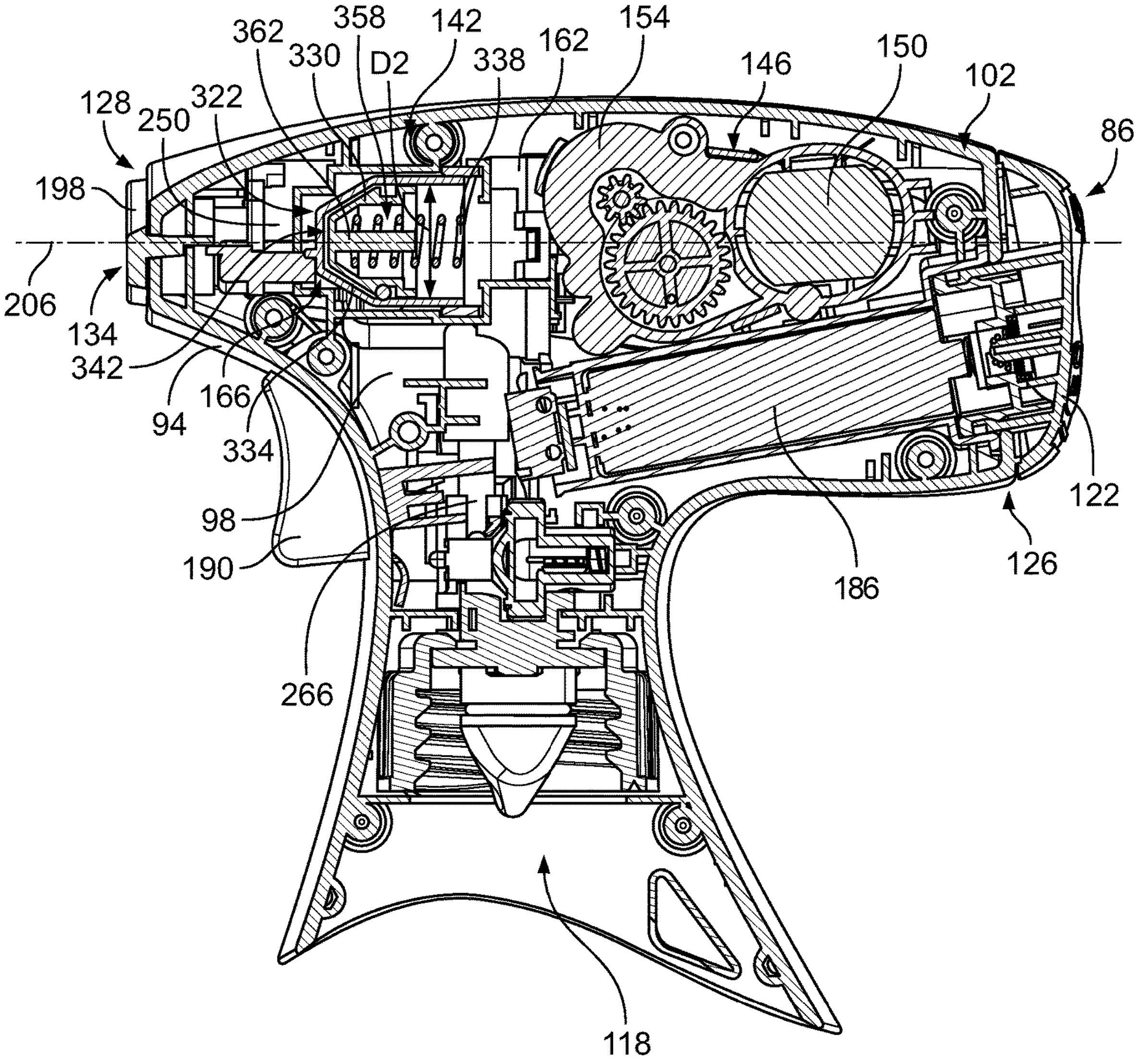
FIG. 13 is a cross-sectional view of the sprayer housing and the sprayer assembly taken along line 13-13 of FIG. 4B.
Figure 15:
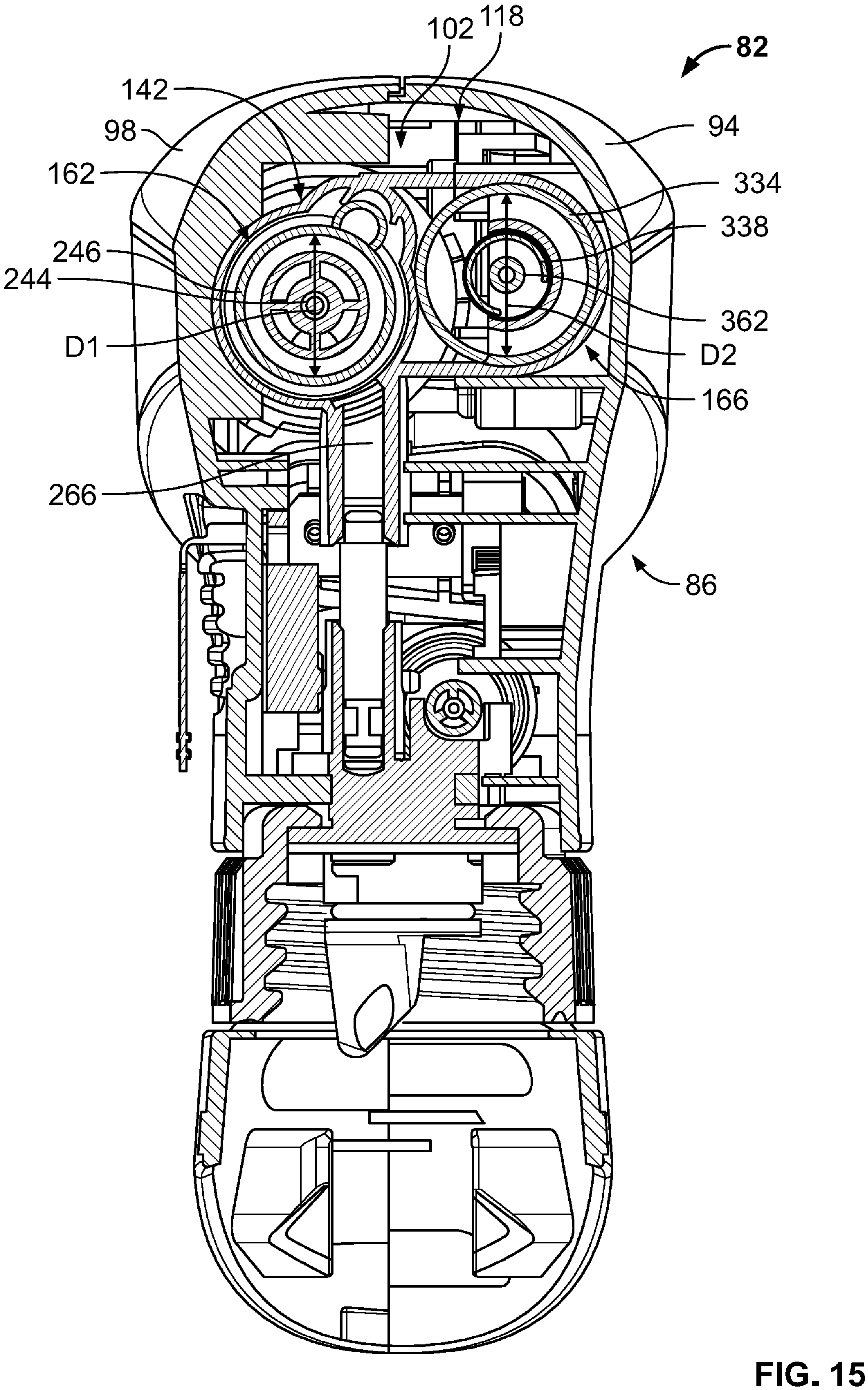
FIG. 15 is a cross-sectional view of the sprayer housing and the sprayer assembly taken along line 15-15 of FIG. 4A.

Referring to FIG. 13, the headspace 342 has an inside diameter D2 (see also FIG. 15). The inside diameter D2 of the pulsation dampener 166 may also be referenced as the inside diameter D2 of the pulsation dampener piston 330. In some embodiments, the inside diameter D2 of the pulsation dampener 166 may be between about 0.5 centimeters ("cm") and about 2.0 cm, about 1.0 cm and about 1.8 cm, or about 1.2 cm and about 1.5 cm. In some embodiments, the inside diameter D2 may be about 1.0 cm, about 1.1 cm, about 1.2 cm, about 1.3 cm, and about 1.4 cm. In some embodiments, the inside diameter D2 may be no greater than about 1.4 cm, about 1.6 cm, or about 2.0 cm. Further, referring to FIG. 15, a ratio of the inside diameter D1 of the pump 162 to the inside diameter D2 of the pulsation dampener 166 may be in a range of between about 1:0.5 and about 1:2. In some embodiments, the ratio of the inside diameter D1 of the pump 162 to the inside diameter D2 of the pulsation dampener 166 may be in a range of between about 1:1.3 and about 1:3.6. In some embodiments, the ratio of inside diameter D1 of the pump 162 to the inside diameter D2 of the pulsation dampener 166 is about 1:0.6, about 1:0.8, about 1:1, about 1:1.2, about 1:1.4, about 1:1.6, about 1:1.8, about 1:2, about 1:2.2, or about 1:2.4. Further, the inside diameter D1 of the pump 162 may be about 70% of the inside diameter D2 of the pulsation dampener 166. In some embodiments, the inside diameter D1 of the pump 162 is about 20%, about 25%, about 28%, about 35%, about 38%, about 42%, about 46%, about 50%, about 53%, about 56%, about 60%, about 63%, about 66%, about 68%, about 72%, about 75%, about 77%, about 82%, about 86%, about 90%, or about 100% of the inside diameter D2 of the pulsation dampener 166. Furthermore, the inside diameter D2 of the pulsation dampener 166 may be about 50%, about 54%, about 60%, about 66%, about 70%, about 75%, about 80%, or about 90% of the inside diameter D1 of the pump 162. The ratio/relationship of these diameters may play a significant role in the performance of the dispensing device 82, which will be described in greater detail below. Additionally, in some embodiments, a ratio of the inside diameter D2 of the pulsation dampener 166 to a maximum deflection distance of the dampener spring 338 is between about 1:1 and about 1:3. In some embodiments, the ratio of the inside diameter D2 of the pulsation dampener 166 to a deflection distance of the dampener spring 338 is about 1:0.8, about 1:1.2, about 1:1.5, about 1:1.8, about 1:2.0, about 1:2.3, about 1:2.6, about 1:2.8, about 1:3.0, about 1:3.3, or about 1:3.5. Further, the inside diameter D2 of the pulsation dampener 166 may be about 30% of the maximum deflection distance of the dampener spring 338. In some embodiments, the inside diameter D2 of the pulsation dampener 166 is about 25%, about 35%, about 40%, about 45%, about 50%, about 60%, about 70%, about 85%, or about 100% of the maximum deflection distance of the dampener spring 338. The aforementioned relationships between the inside diameter D2 of the pulsation dampener 166 and the maximum deflection distance of the dampener spring 338 may also be applicable to an average deflection distance of the dampener spring 338. The average deflection distance of the dampener spring 338 may be an average for a duration of time. Further, the average deflection distance of the dampener spring 338 may be an average during steady state.

Referring again to FIG. 11, the pulsation dampener 166 of the pump assembly 142 is configured to provide a more continuous pressure behind the nozzle 134 and, accordingly, a continuous flow of fluid out of the nozzle 134. The dampener housing 334 may define an opening 350 that is disposed proximate the pump outlet 254 and is in fluid communication with the discharge conduit 250 of the pump assembly 142. Therefore, instead of traveling from the outlet 254 of the pump 162 directly through the discharge conduit 250 to the nozzle 134, fluid may access the pulsation dampener 166 through the opening 350 that is in fluid communication with the discharge conduit 250. The dampener piston 330 may have an O-ring 354 disposed therearound to create a liquid-tight seal within the dampener housing 334, thereby isolating the variable volume headspace 342 from a spring region 358 that holds the spring 338. The spring region 358 contains a dampener piston shaft 362 and the spring 338 and is configured to hold a gas, such as, e.g., air, whereas the variable volume headspace 342 is configured to hold the fluid that is being dispensed.

Generally, the dampener piston 330 is configured to linearly translate to accommodate and reduce pressure changes within the nozzle 134. For example, as the fluid travels from the outlet 254 of the pump 162, the pressure against the nozzle 134 may naturally increase. In response, the fluid may provide pressure onto the dampener piston 330, thereby causing the dampener piston 330 to linearly translate toward a compressed configuration in which the dampener spring 338 is compressed. In the compressed configuration, the air that is held within the spring region 358 is vented out of the dampener housing 334 as the piston 242 moves to increase the volume of the headspace 342, thereby reducing the pressure normally experienced during a discharge step of a conventional pump. Correspondingly, during the subsequent intake step of the pump 162, as the pressure within the nozzle begins to reduce, the dampener piston 330 may linearly translate again to decompress the spring 338, drawing air back into the spring region 358. Consequently, the internal volume within the variable volume headspace 342 is reduced, which mitigates a significant pressure drop during the intake cycle. As a result, the dampener piston 330 linearly translates to compress and decompress the spring 338 within the spring region 358 and respectively increase and decrease the volume of the headspace 342, which results in reduced pressure fluctuations within the discharge conduit 250 and against nozzle 134. Consequently, fluid is dispensed through the nozzle 134 at a substantially consistent fluid flow rate.

Figure 14:
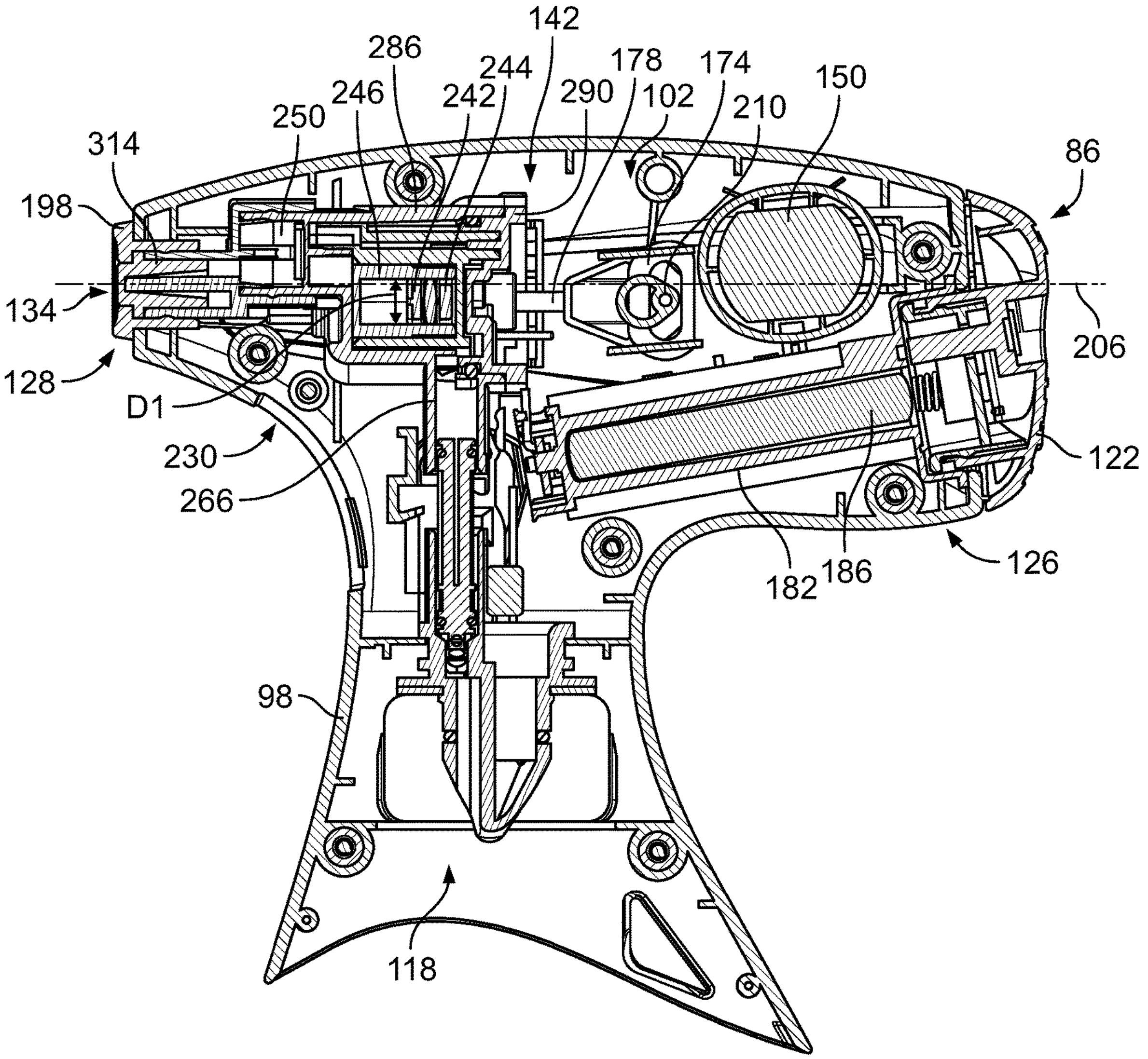
FIG. 14 is a cross-sectional view of the sprayer housing and the sprayer assembly taken along line 14-14 of FIG. 4B.

Referring to FIG. 14, when the trigger 190 is depressed, the motor 150 causes piston 242 to reciprocate in the pump chamber 246, and the pump suction draws a mixture of the diluent and chemical into the pump chamber 246. The pump suction draws fluid from an attached container, such as the diluent reservoir 106 and/or the chemical concentrate container 108 shown in FIG. 2. The pump 162 expels the fluid into the discharge conduit 250 which is in fluid communication with the opening 350 of the pulsation dampener 166 and the nozzle 134 for spraying the fluid. Referring again to FIG. 13, the fluid may flow either through the nozzle 134 or through the opening 350 into the pulsation dampener 166. As fluid is discharging from the pump 162, pressure within the discharge conduit 250 may increase, and the fluid within the pulsation dampener 166 may provide a force on the pulsation dampener piston 330, causing the dampener piston 330 to linearly move, thereby compressing the dampener spring 338 and increasing the volume of the variable volume headspace 342. Simultaneously, fluid may be discharging through the nozzle 134. As the nozzle 134 is undergoing its intake step, the dampener piston 330 reduces the volume of the variable volume headspace 342 to minimize pressure fluctuations on the nozzle 134 and mitigate fluid flow reduction through the nozzle 134.

Figure 16:
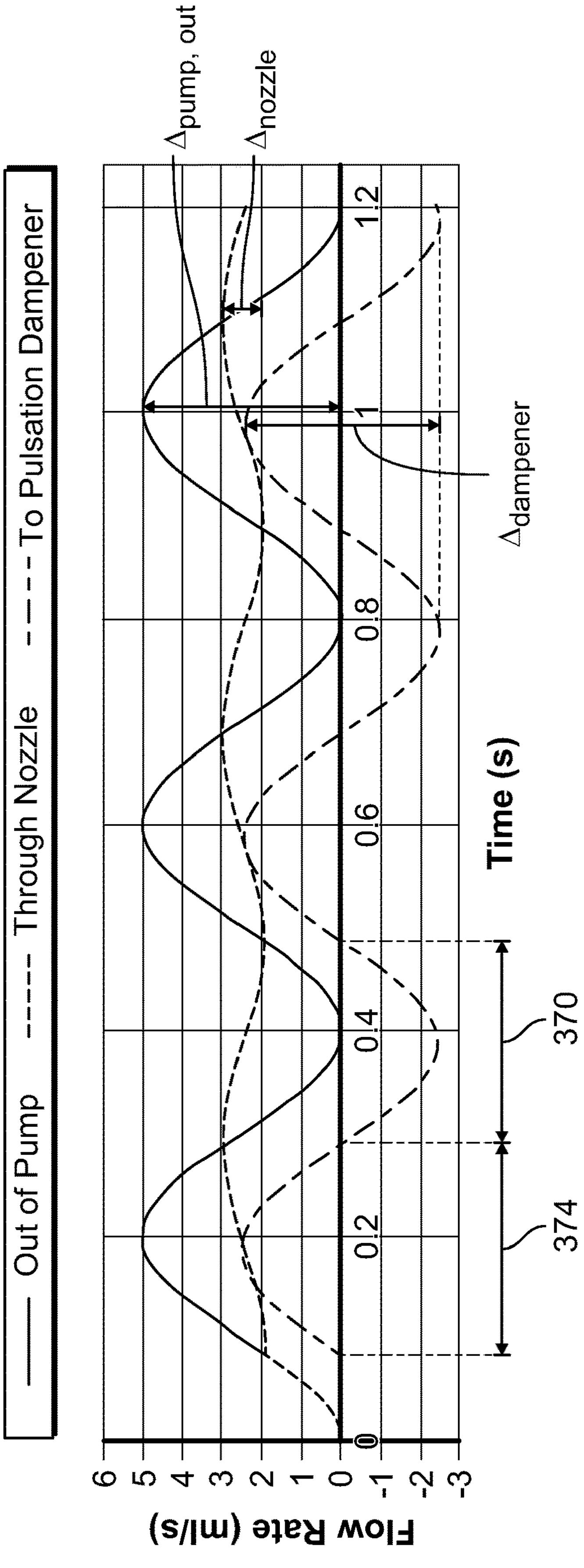
FIG. 16 is a graph illustrating various flow rates of a fluid at different locations moving through the dispenser of FIG. 2.

FIGS. 16-26 provide a series of graphs that demonstrate how a pulsation dampener, such as the pulsation dampener 166 of FIG. 5, may affect the performance of a dispenser. With reference to FIG. 16, a flow rate in meters per second ("m/s") of a fluid being dispensed by a dispenser is graphed for a duration of time at three locations. For example, a flow rate out of the fluid exiting the pump is shown. The flow rate out of the pump generally oscillates between an intake step 370 and a discharge step 374 such that the flow rate gradually increases before rising sharply and then leveling at a maximum flow rate, e.g., about 5.0 m/s in the present example. Subsequently, the flow rate decreases in an opposing manner, i.e., gradually decreasing before decreasing sharply, and then gradually leveling at a minimum flow rate, e.g., about 0 m/s. The flow rate out of the pump generally follows this trend of oscillating between the maximum flow rate and the minimum flow rate.

While the maximum flow rate in the embodiment illustrated is about 5.0 m/s, the maximum flow rate may be about 2.0 m/s, about 4.0 m/s, about 6.0 m/s, about 8.0 m/s, between about 1.5 m/s and about 4.5 m/s, between about 2.0 m/s and about 6.0 m/s, at least 1.0 m/s, or at least 1.8 m/s, for example. A flow rate of the fluid to the pulsation dampener is shown in connection with the flow rate out of the pump. As the pump cycles through the intake step 370 and the discharge step 374, portions of the fluid may be exchanged between the pulsation dampener and the pump to reduce pressure fluctuations within the system and against the nozzle. For example, during the intake step 370 of the pump, the pulsation dampener is generally feeding the nozzle, which is shown by a negative flow rate to the pulsation dampener.

During the discharge step 374 of the pump, the pump 162 feeds the pulsation dampener, which is shown by a positive flow rate to the pulsation dampener. The flow rate to the pulsation dampener generally oscillates at a rate that substantially corresponds to the oscillation of the flow rate out of the pump. Generally, the change in flow rate out of the pump $\Delta_{pump,out}$, i.e., 5 m/s in the embodiment illustrated, may substantially equate to the change in flow rate to the pulsation dampener $\Delta_{dampener}$. Thus, in the illustrated embodiment, the flow rate to the pulsation dampener oscillates between a maximum of about +2.5 m/s and a minimum of about −2.5 m/s. Although the flow rate to the pulsation dampener in the present embodiment oscillates between the maximum of about +2.5 m/s and the minimum of about −2.5 m/s, minimum and maximum flow rates may vary in different embodiments. For example, in some embodiments the fluid flow rate to the pulsation dampener may oscillate between about +3.0 m/s and about −3.0 m/s, between about +2.0 m/s and about −2.0 m/s, or between about +1.5 m/s and about −1.5 m/s.

Still referring to FIG. 16, a combination of the flow rate trends experienced by the pump and the pulsation dampener may result in a substantially steady flow rate out of the nozzle. The flow rate out of the nozzle in the embodiment illustrated generally oscillates between about 2.0 m/s and about 3.0 m/s. Thus, in the present embodiments, a variance in flow rate out of the nozzle, i.e., $\Delta_{nozzle}$, is no greater than about 40% of its maximum flow rate. In some embodiments, the flow rate variance $\Delta_{nozzle}$ may be less than about 50%, about 35%, about 30%, about 25%, or about 15% of the maximum flow rate. This trend is a result of the pulsation dampener accommodating the increase in flow rate out of the pump and, correspondingly, mitigating a significant increase in pressure by feeding the pulsation dampener. Furthermore, a maximum flow rate out of the nozzle may be no greater than about 60%, about 65%, about 70%, about 75%, or about 80% of the maximum flow rate out of the pump, and a minimum flow rate out of the nozzle may be no less than about 30%, about 35%, about 40%, or about 45% of the maximum flow rate out of the pump.

Figure 17:
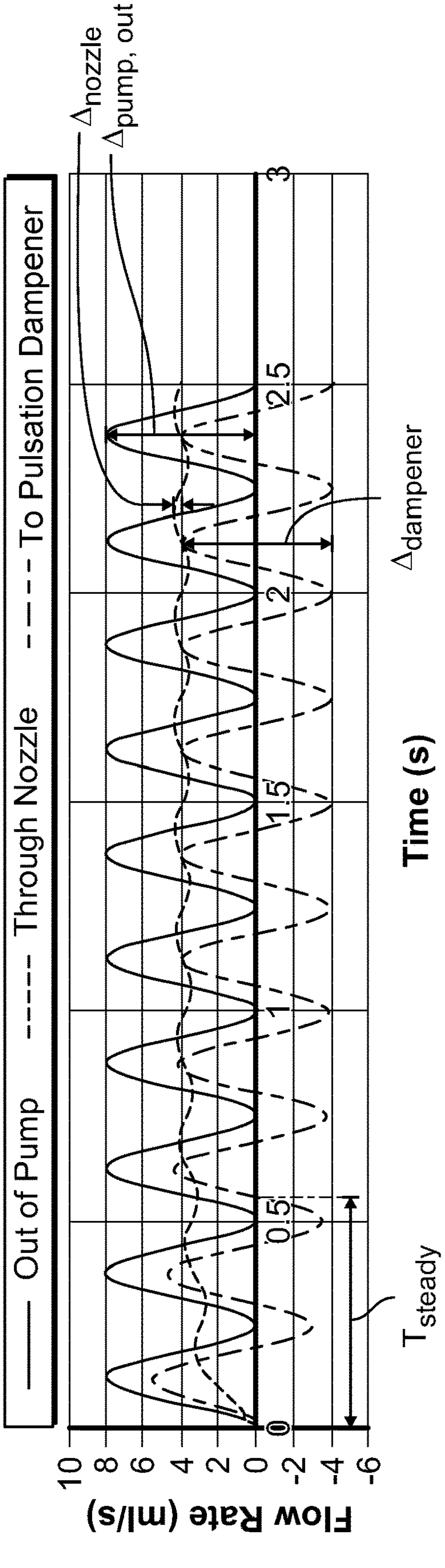
FIG. 17 is a graph illustrating various flow rates of a fluid at different locations moving through the dispenser of FIG. 2.
Figure 18:
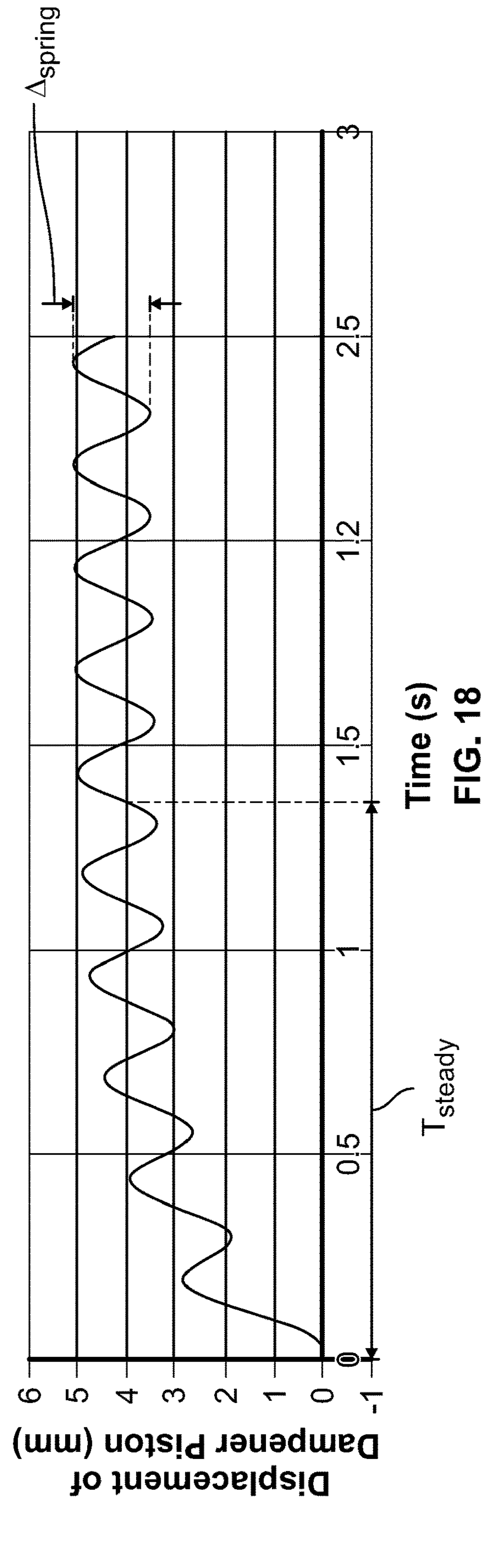
FIG. 18 is a graph illustrating displacement of a dampener piston over time in the dispenser of FIG. 2.

FIGS. 17 and 18 illustrate another example of performance metrics of a fluid application system. Referring particularly to FIG. 17, a maximum flow rate out of the pump is about 8 m/s. Thus, the flow rate out of the pump oscillates between the maximum of about 8.0 m/s and a minimum of about 0.0 m/s. Correspondingly, the flow rate to the pulsation dampener oscillates between a maximum of about +4.0 m/s and a minimum of about −4.0 m/s. A flow rate of the resulting fluid flow through the nozzle varies between about 3.6 m/s and about 4.4 m/s. Thus, a variance in flow rate through the nozzle, i.e., $\Delta_{nozzle}$, in the embodiment illustrated is about 10% of the maximum flow rate out of the pump. It may take a minimum amount of time, i.e., $\tau_{steady}$, before the flow rate through the nozzle reaches steady state. For example, in the embodiment illustrated, it takes about 0.5 seconds until the fluid flow through the nozzle reaches steady state. In some embodiments, it may take between about 0.1 and about 0.3 seconds, about 0.2 and about 0.4 seconds, about 0.3 and about 0.5 seconds, or about 0.4 and about 1.0 seconds.

FIG. 18 illustrates a displacement of a dampener piston of the pulsation dampener, which may be substantially similar to the dampener piston 330 shown in FIG. 13. Similar to the flow rate through the nozzle shown in FIG. 19, the displacement of the dampener piston also requires an amount of time, i.e., $\tau_{steady}$, before it reaches steady state. In the illustrated embodiment, it takes about 1.4 seconds before the dampener piston reaches steady state. In some embodiments, the dampener piston may reach steady state after about 0.8 seconds, about 1.2 seconds, about 1.6 seconds, or about 2.0 seconds. In some embodiments, it may take no longer than about 1.0 seconds, about 1.5 second, about 2.0 seconds, or about 2.5 seconds for the dampener piston to reach steady state.

Once at steady state, the dampener piston oscillates between a maximum dampener piston displacement of about 5 mm and a minimum of about 3.2 mm. In some embodiments, the maximum may be between about 2 mm and about 7 mm, between about 2.5 mm and about 5 mm, or between about 3.5 mm and about 6 mm. The minimum may be between about 0.5 mm and about 5 mm, between about 1 mm and about 4.5 mm, or between about 3 mm and about 4 mm. A deflection distance of the spring, i.e., $\Delta_{spring}$, may be related to the inside diameter of the pulsation dampener. For example, a ratio of the inside diameter of the pulsation dampener housing, e.g., diameter D2 in FIG. 13, to the deflection distance, i.e., $\Delta_{spring}$, may be in a range of between 1:1 and about 1:3. In some embodiments, the ratio may be between about 1:0.7 and about 1:5.

Figure 19:
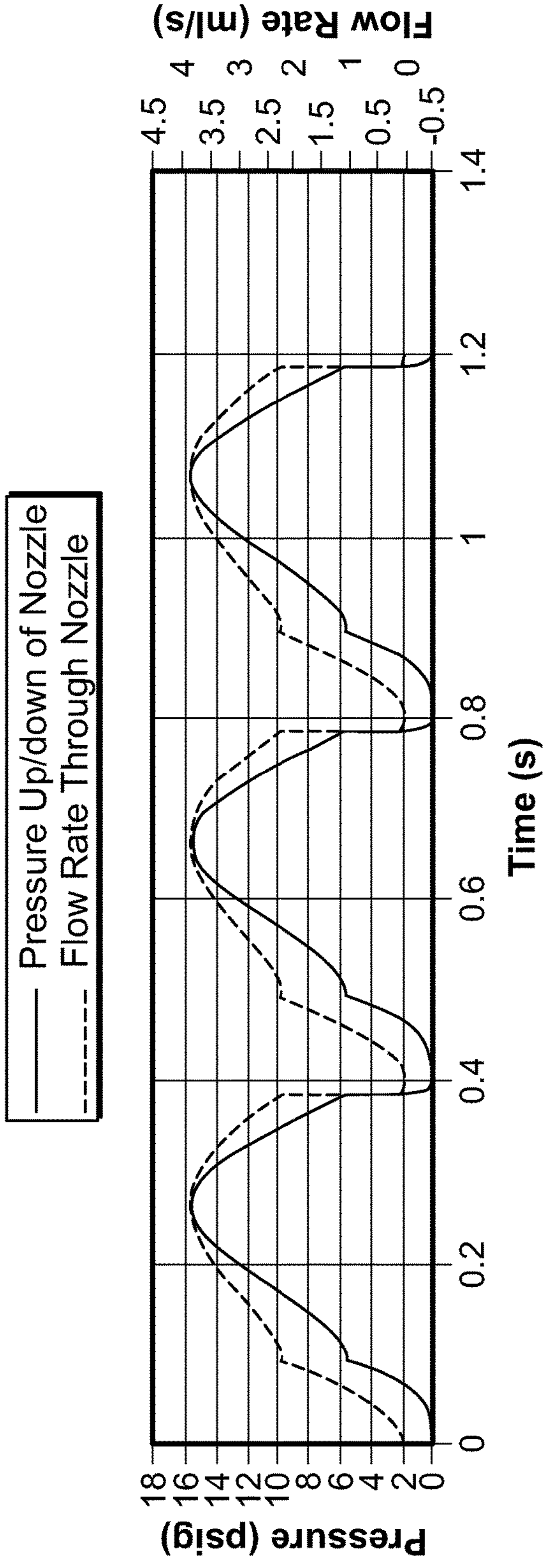
FIG. 19 is a graph illustrating a pressure and flow rate of a fluid moving through a nozzle of the dispenser of FIG. 2.
Figure 20:
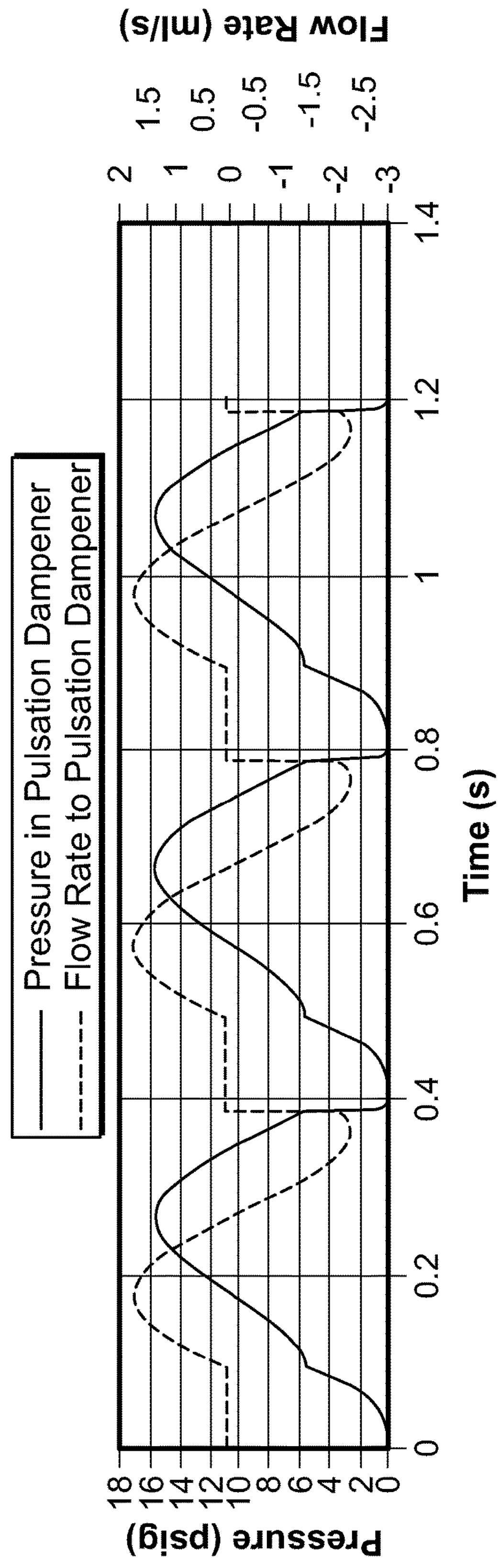
FIG. 20 is a graph illustrating a pressure and flow rate of a fluid moving through a dampener of the dispenser of FIG. 2.
Figure 21:
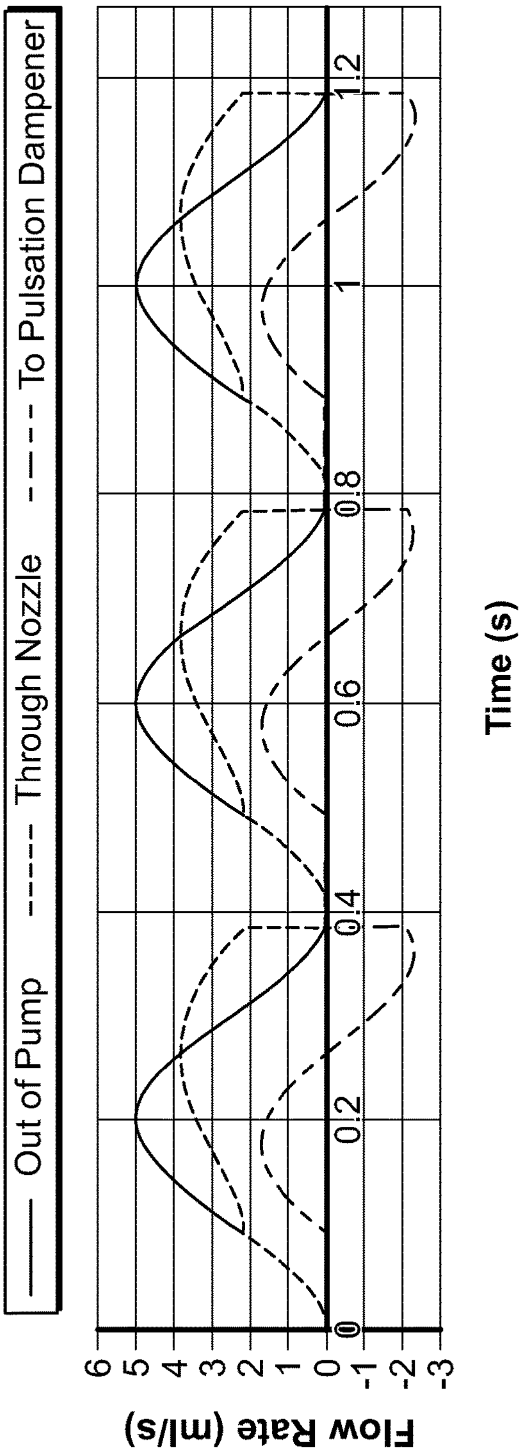
FIG. 21 is a graph illustrating a flow rate of a fluid over time through the dispenser of FIG. 2.
Figure 22:
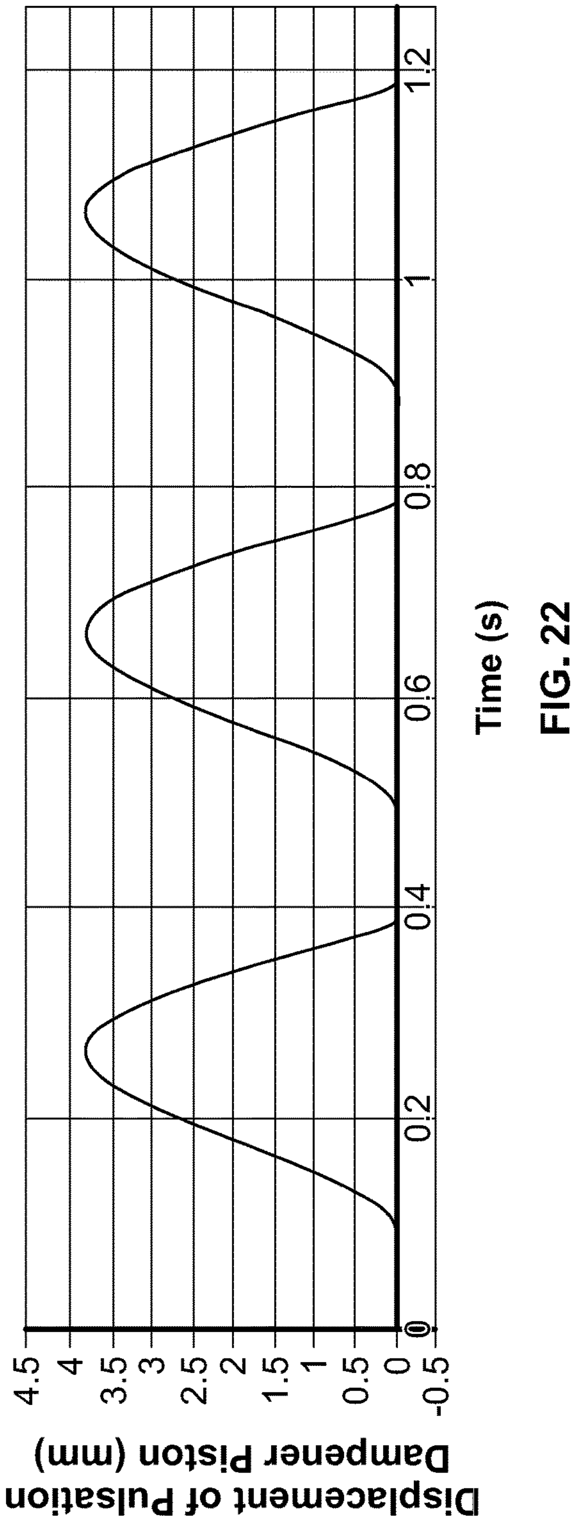
FIG. 22 is a graph illustrating a displacement of a dampener piston over time in the dispenser of FIG. 2.

FIGS. 19-22 illustrate how reducing the inside diameter of a pulsation dampener and, accordingly, reducing a ratio of the pulsation dampener inside diameter to the pump inside diameter may affect the performance of a dispenser. Referring specifically to FIGS. 19 and 20, in connection with a pulsation dampener having a relatively smaller inside diameter, various nozzle and pulsation dampener pressures and flow rates are illustrated over time. Generally, pulsation dampeners having relatively smaller inside diameters and diameter ratios cannot deliver enough fluid to maintain a constant flow rate through the nozzle, which results in the flow rate shown in FIG. 19. Further, pulsation dampeners with relatively smaller diameters have less piston surface area, and, thus, lower force against the pulsation dampener spring.

Therefore, a lower spring rate may be required to allow the reduced force against the pulsation dampener spring to overcome the spring force. However, if the spring rate is too low, it may be insufficient for dispensing the fluid through the nozzle, resulting in an unsteady, discontinuous flow. As shown in FIG. 19, rather than a continuous, steady-state flow rate, such as the flow rate through the nozzle shown in FIG. 16, the flow rate through the nozzle in the present embodiment irregularly varies from a minimum of about 0 m/s to a maximum of about 4.0 m/s. Pressures at the nozzle and the pulsation dampener follow this irregular trend. Thus, a fluid flow with this flow rate would not qualify as steady state.

Figure 23:
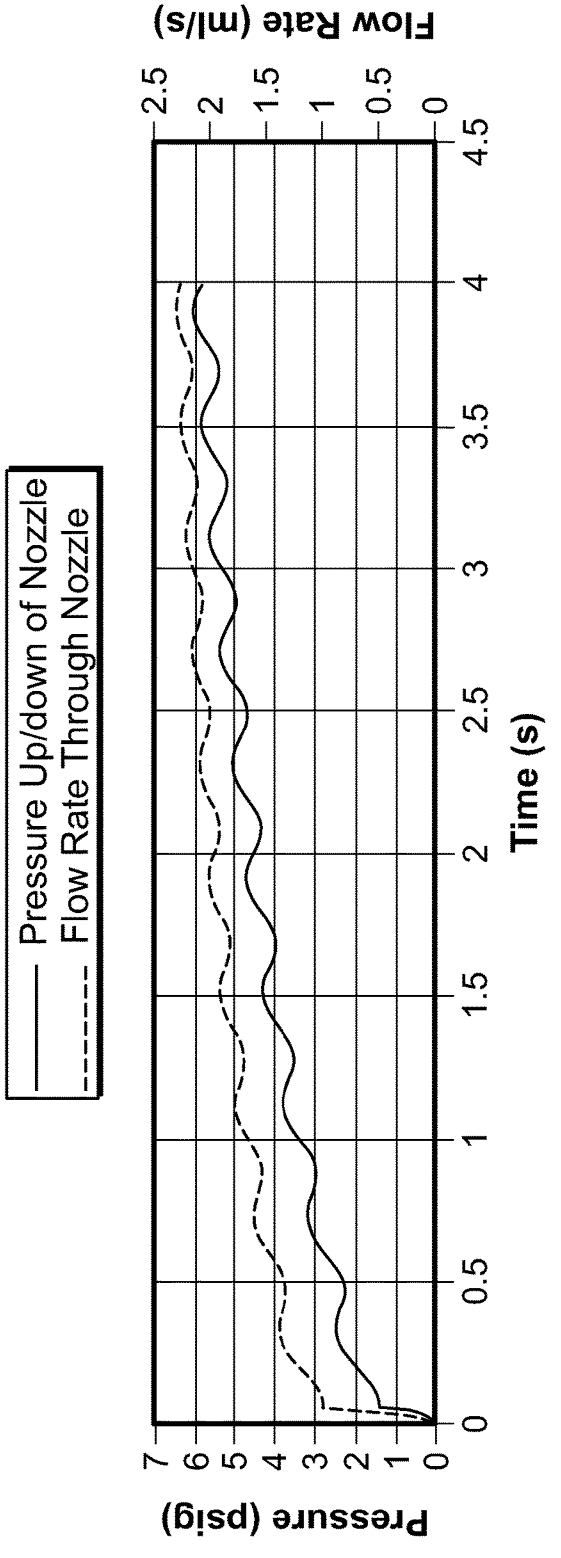
FIG. 23 is a graph illustrating a pressure and flow rate of a fluid moving through a nozzle of the dispenser of FIG. 2.

Similarly, FIGS. 23-26 illustrate how increasing the inside diameter of a pulsation dampener and, correspondingly, increasing the inside diameter ratio may have adverse effects on the performance of a dispenser. At higher pulsation dampener diameters and higher ratios, the time to reach steady state may be increased because the volumes of the pump and the pulsation dampener are larger. Thus, the pump and pulsation dampener can hold more fluid and require more cycles to reach steady state. For example, as shown in FIG. 23, pressure and flow rate through the nozzle has yet to reach steady state after four seconds.

Figure 24:
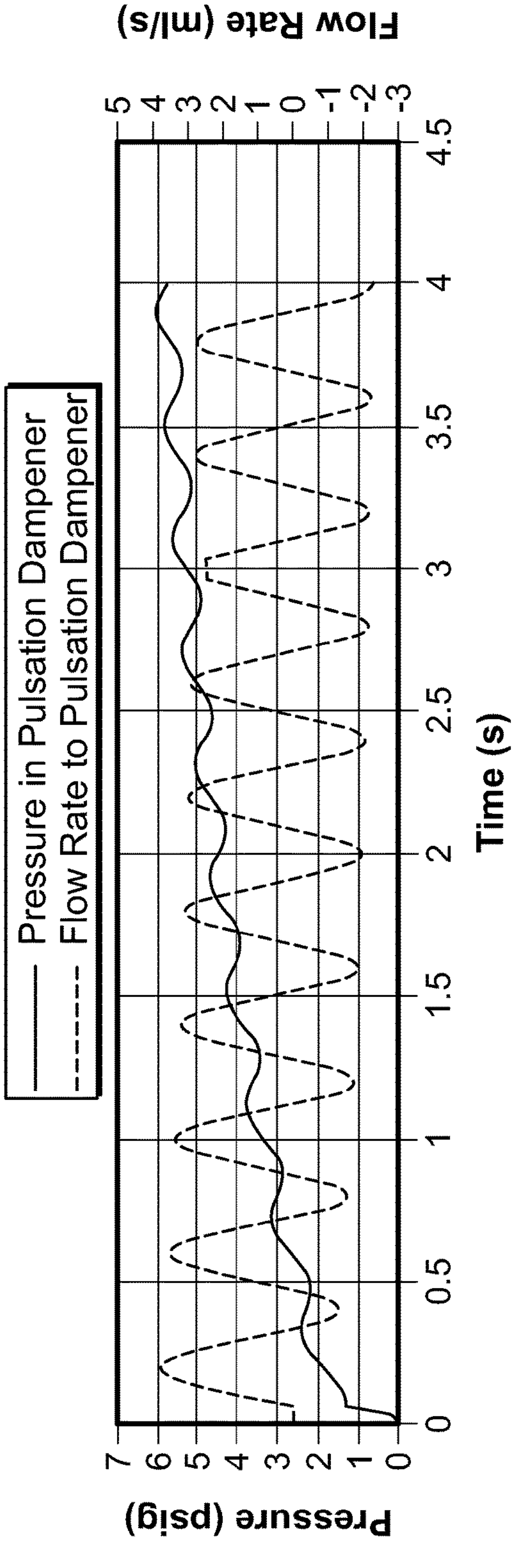
FIG. 24 is a graph illustrating a pressure and flow rate of a fluid moving through a dampener of the dispenser of FIG. 2.
Figure 25:
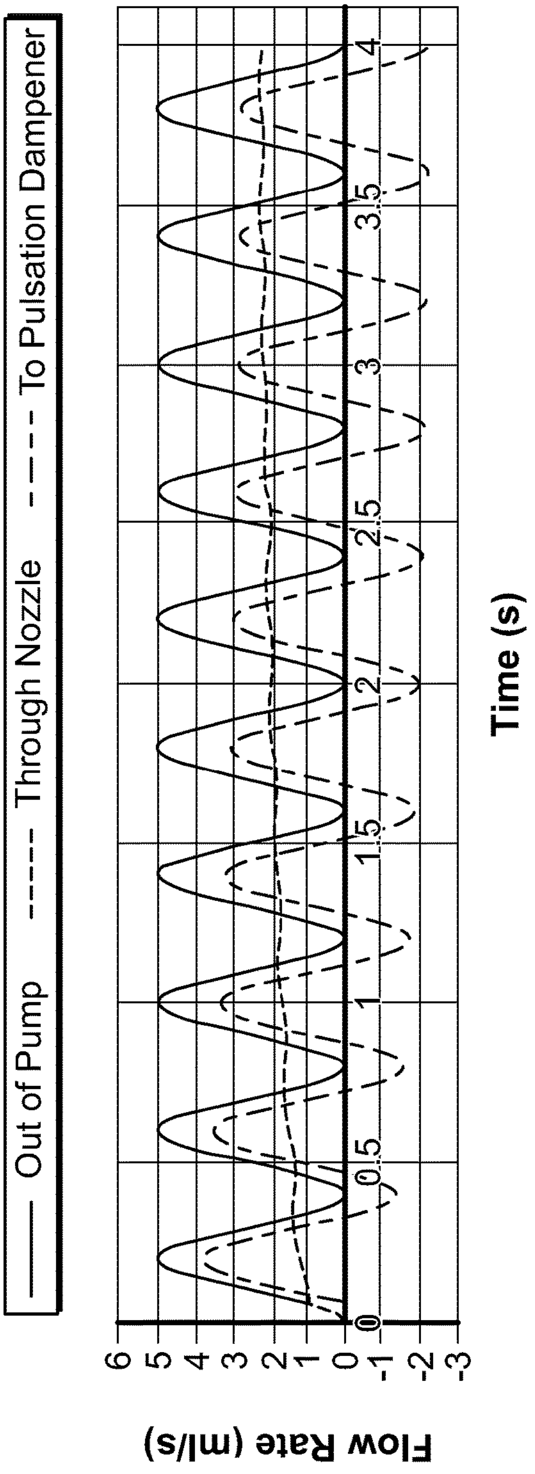
FIG. 25 is a graph illustrating various flow rates of a fluid over time moving through the dispenser of FIG. 2.
Figure 26:
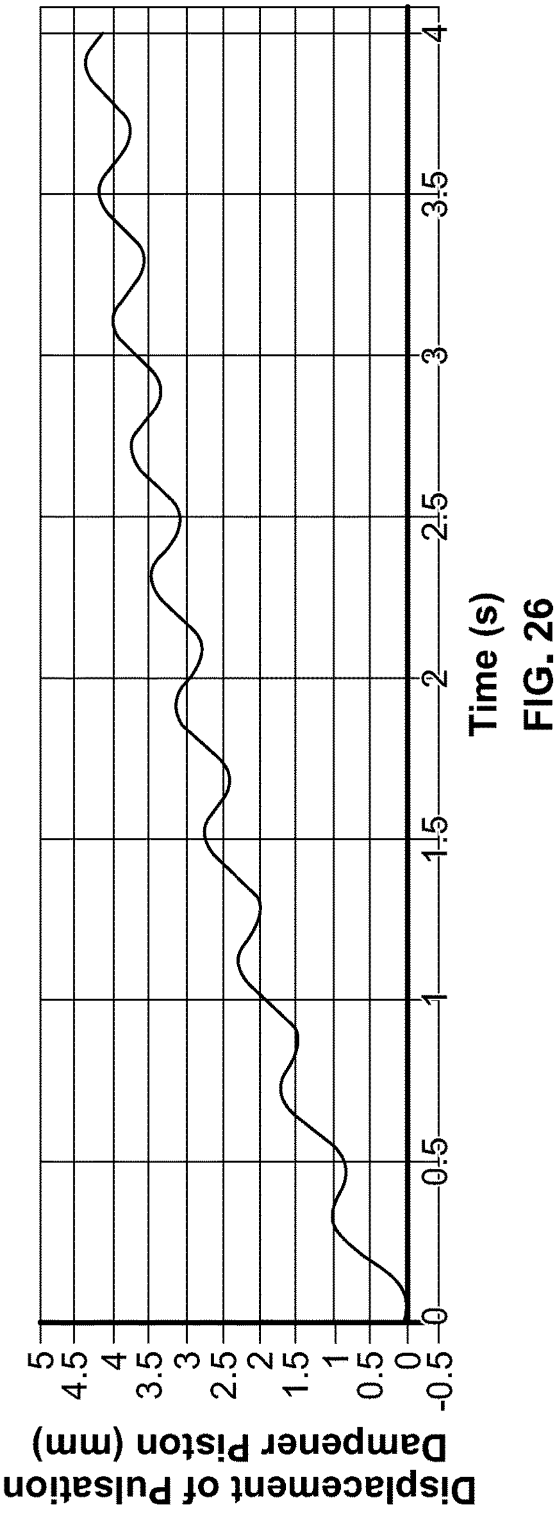
FIG. 26 is a graph illustrating a displacement of a dampener piston over time in the dispenser of FIG. 2.

Referring now to FIG. 24, the pressure and flow rate at the pulsation dampener fails to reach steady state after four seconds. FIGS. 25 and 26 further illustrate the fluid application system's failure to achieve steady state. More specifically, in FIG. 25, although the flow rate out of the pump oscillates regularly between about 0 m/s and about 5 m/s, because the flow rate to the pulsation dampener fails to reach steady state, the flow rate through the nozzle continues to gradually increase. FIG. 26 illustrates the displacement of the pulsation dampener piston over time, which gradually increases over the four second time interval. Additionally, sprayer assemblies having pulsation dampeners with large diameters may experience greater trigger release lag. More specifically, because the pulsation dampener can hold excess fluid, the fluid may continue to discharge through the nozzle after the trigger is released and the pump stops. Also, due to size constraints, pulsation dampeners with large diameters may be generally undesirable.

INDUSTRIAL APPLICABILITY

Numerous modifications will be apparent to those skilled in the art in view of the foregoing description. Accordingly, this description is to be construed as illustrative only and is presented for the purpose of enabling those skilled in the art to make and use the embodiments disclosed herein. The exclusive rights to all modifications which come within the scope of the application are reserved.

We claim:

1. A dispenser, comprising:

a pump having a pump chamber that receives a fluid;

a pulsation dampener having a dampener housing with an interior volume and a dampener housing opening, the pulsation dampener further having a spring biased movable piston located in the interior volume and defining a variable volume headspace between the piston and the dampener housing opening; and a discharge conduit providing fluid communication between each of an outlet of the pump chamber, the dampener housing opening of the pulsation dampener, and a nozzle that is configured to dispense the fluid when the pump is activated, wherein, when the pump is activated, at least a portion of the fluid from the outlet of the pump chamber flows within the discharge conduit to the dampener housing opening of the pulsation dampener, and wherein the dispenser is configured to, when the pump is activated, emit a substantially constant stream of the fluid from the nozzle for at least one second.

2. The dispenser of claim 1, wherein a ratio between a first inside diameter of the pump chamber and a second inside diameter of the pulsation dampener is in a range between about 1:0.5 and about 1:2.

3. The dispenser of claim 1, wherein a first inside diameter of the pump chamber is in a range between about 50% and about 90% of a second inside diameter of the pulsation dampener.

4. The dispenser of claim 3, wherein the first inside diameter of the pump chamber is about 70% of the second inside diameter of the pulsation dampener.

5. The dispenser of claim 1, wherein the pulsation dampener is configured such that the variable volume headspace of the pulsation dampener has a maximum volume in a range between about 1.0 ml and about 6.5 ml.

6. The dispenser of claim 1, wherein the pulsation dampener is configured such that, during continuous operation of the pump, the variable volume headspace of the pulsation dampener has an average volume in a range between about 0.5 ml and about 3.5 ml.

7. The dispenser of claim 1, wherein the dispenser is configured to, when the pump is activated, emit the fluid from the nozzle in a direction along a longitudinal axis collinear with a center of the nozzle, and wherein the piston of the pulsation dampener is moveable along a piston dampener axis that is parallel with the longitudinal axis.

8. The dispenser of claim 1 further comprising:

a reservoir configured for holding a diluent; and a container configured for holding a chemical, wherein the fluid is formed from a mixture of the diluent and the chemical that is supplied to an intake conduit, which supplies the fluid to an inlet of the pump chamber, the fluid having a viscosity in a range between about 0.9 mPa-s and about 1.7 mPa-s.

9. The dispenser of claim 1, wherein, when the pump is activated, the pulsation dampener is configured to cause the fluid to flow out of the nozzle at a flow rate of between about 1.5 ml/s and about 4.5 ml/s for a period of at least three seconds.

10. A dispenser, comprising:

a sprayer housing; and a sprayer assembly arranged within an internal cavity of the sprayer housing, the sprayer assembly including:

a pump assembly including a pump having a pump chamber and a pulsation dampener having a dampener housing with an interior volume and a dampener housing opening;

a gearbox assembly including a cam assembly configured to drive the pump, an electric motor, and a transmission driven by the electric motor that is configured to drive the cam assembly;

a nozzle configured to dispense fluid from the sprayer housing when the pump is activated;

an intake conduit that supplies the fluid to an inlet of the pump chamber; and a discharge conduit providing fluid communication between each of an outlet of the pump chamber, the dampener housing opening of the pulsation dampener, and the nozzle, wherein, when the pump is activated, the fluid from the outlet of the pump chamber flows within the discharge conduit to both the dampener housing opening of the pulsation dampener and through the nozzle to be emitted from the dispenser.

11. The dispenser of claim 10, wherein the pump assembly has a volume in a range between about 25 $cm^3$ and about 50 $cm^3$.

12. The dispenser of claim 10, wherein a longitudinal length of the gearbox assembly and the pump assembly collectively is in a range between about 60% and about 90% of a longitudinal length of the sprayer housing.

13. The dispenser of claim 10, wherein the internal cavity of the sprayer housing has a volume less than 300 $cm^3$.

14. The dispenser of claim 10, wherein the pump assembly occupies less than 30% of a volume of the internal cavity of the sprayer housing.

15. The sprayer assembly of claim 10, wherein the gearbox assembly further includes a push rod that reciprocates a piston in the pump chamber of the pump.

16. The sprayer assembly of claim 15, wherein the cam assembly includes a cam follower and a cam shaft, and wherein the push rod of the gearbox assembly is coupled to the cam follower of the cam assembly such that the push rod drives the cam follower to reciprocate the piston of the pump.

17. The sprayer assembly of claim 16, wherein the piston of the pulsation dampener is moveable along a piston dampener axis, and wherein the piston of the pump is reciprocated along a piston pump axis that is parallel to the piston dampener axis.

18. A dispenser, comprising:

a pump having a pump chamber;

an intake conduit;

a discharge conduit in fluid communication with an outlet of the pump chamber and with a nozzle that is configured to dispense fluid when the pump is activated; and a pulsation dampener having a dampener housing with an interior volume and a dampener housing opening, the pulsation dampener further having a spring biased movable piston located in the interior volume and defining a variable volume headspace between the piston and the dampener housing opening of the pulsation dampener, the dampener housing opening being in fluid communication with the discharge conduit, wherein the dispenser is configured to, when the pump is activated, emit a substantially constant stream of the fluid from the nozzle for at least one second.

19. The dispenser of claim 18, wherein the dispenser is configured to, when the pump is activated, emit the fluid from the nozzle in a direction along a longitudinal axis collinear with a center of the nozzle, of which any emission of the fluid for a distance of about 1 m from the nozzle and for a time period of 5 seconds or less onto a spraying surface will create a spray pattern having a minimum amplitude that is at least 50% of a maximum amplitude of the spray pattern.

20. The dispenser of claim 19, wherein at least 80% of the spray pattern has an amplitude of 12 cm or less.

* * * * *